(12) United States Patent
Martin et al.

(10) Patent No.: US 12,438,902 B2
(45) Date of Patent: Oct. 7, 2025

(54) EVENT-DRIVEN MONITORING OF RESOURCES IN A CLOUD COMPUTING ENVIRONMENT

(71) Applicant: Rapid7, Inc., Boston, MA (US)

(72) Inventors: Dylan Martin, Belfast (GB); Austin Lee, Pasadena, CA (US); Trever Allen McKee, Shafter, CA (US); James Andrew Green, Hidden Hills, CA (US); Chris DeRamus, Ashburn, VA (US)

(73) Assignee: Rapid7, Inc., Boston, MA (US)

( * ) Notice: Subject to any disclaimer, the term of this patent is extended or adjusted under 35 U.S.C. 154(b) by 74 days.

(21) Appl. No.: 18/488,808

(22) Filed: Oct. 17, 2023

(65) Prior Publication Data

US 2024/0152609 A1    May 9, 2024

Related U.S. Application Data

(60) Provisional application No. 63/460,576, filed on Apr. 19, 2023, provisional application No. 63/423,890, filed on Nov. 9, 2022.

(51) Int. Cl.
| | |
|---|---|
| *H04L 29/06* | (2006.01) |
| *G06F 21/55* | (2013.01) |
| *H04L 9/40* | (2022.01) |
| *H04L 47/70* | (2022.01) |

(52) U.S. Cl.
CPC ........ *H04L 63/1433* (2013.01); *G06F 21/554* (2013.01); *H04L 47/82* (2013.01); *G06F 2221/034* (2013.01)

(58) Field of Classification Search
CPC .................................................. H04L 63/1433
See application file for complete search history.

(56) References Cited

U.S. PATENT DOCUMENTS

| | | |
|---|---|---|
| 7,409,719 B2 | 8/2008 | Armstrong et al. |
| 9,917,854 B2 | 3/2018 | Natanzon et al. |
| 10,536,471 B1 | 1/2020 | Derbeko et al. |
| 11,431,735 B2 | 8/2022 | Shua |

(Continued)

OTHER PUBLICATIONS

Hirwani et al., Forensic acquisition and analysis of vmware virtual hard disks. SAM'12 The 2012 International Conference on Security and Management. Jul. 2012. 8 pages.

(Continued)

*Primary Examiner* — Bradley W Holder
(74) *Attorney, Agent, or Firm* — Wolf, Greenfield & Sacks, P.C.

(57) ABSTRACT

Techniques for event driven harvesting and analysis of cloud computing resources in a cloud computing environment, comprising: obtaining, from a cloud computing environment, data related to an event that occurred in the cloud computing environment; in response to obtaining the data, requesting, from the cloud computing environment, supplemental data about the event that occurred in the cloud computing environment, the supplemental data including information about the event and/or information about impact of the event on a resource; determining whether a security action is to be taken at least in part by analyzing the data and/or the supplemental data; and when it is determined a security action is to be taken, performing the security action.

20 Claims, 16 Drawing Sheets

(56) References Cited

U.S. PATENT DOCUMENTS

| | | | |
|---|---|---|---|
| 11,663,031 | B2 | 5/2023 | Shua |
| 2013/0067582 | A1* | 3/2013 | Donovan .............. G06F 21/552 726/25 |
| 2013/0247185 | A1 | 9/2013 | Viscuso et al. |
| 2017/0364412 | A1 | 12/2017 | Tsirkin |
| 2021/0012000 | A1 | 1/2021 | Halcrow et al. |
| 2021/0099478 | A1* | 4/2021 | Seetharamaiah ... H04L 63/1433 |
| 2022/0279012 | A1* | 9/2022 | Seetharamaiah ... H04L 63/1425 |
| 2022/0345480 | A1* | 10/2022 | Shua ..................... G06F 21/577 |
| 2023/0239296 | A1 | 7/2023 | Shachar et al. |
| 2024/0154992 | A1 | 5/2024 | Martin et al. |

OTHER PUBLICATIONS

Joseph et al., Detection of malware attacks on virtual machines for a self-heal approach in cloud computing using VM snapshots. Journal of Communications Software and Systems. Sep. 1, 2018;14(3):249-57.

Nicolae et al., BlobCR: Efficient checkpoint-restart for HPC applications on IaaS clouds using virtual disk image snapshots. SC'11: Proceedings of 2011 International Conference for High Performance Computing, Networking, Storage and Analysis. Nov. 12, 2011. 12 pages.

Rani et al., An efficient approach to forensic investigation in cloud using VM snapshots. In2015 International Conference on Pervasive Computing (ICPC). Jan. 8, 2015. 5 pages.

Srivastava et al., Trusted VM snapshots in untrusted cloud infrastructures. Research in Attacks, Intrusions, and Defenses: 15th International Symposium, RAID 2012, Amsterdam, The Netherlands, Sep. 12-14, 2012. 21 pages.

Tang, FVD: A High-Performance Virtual Machine Image Format for Cloud. 2011 USENIX Annual Technical Conference (USENIX ATC 11). 18 pages.

Umamaheswari et al., INSPECT—An intelligent and reliable Forensic Investigation through Virtual Machine Snapshots. International Journal of Modern Education and Computer Science. Mar. 1, 2018;12(3):17-28.

Yu et al., SNPdisk: an efficient para-virtualization snapshot mechanism for virtual disks in private clouds. IEEE Network. Jul. 18, 2011;25(4):20-6.

Zach et al., LiveCloudInspector: Towards Integrated IaaS Forensics in the Cloud. Proceedings of the 15th IFIP WG 6.1 International Conference on Distributed Applications and Interoperable Systems. Jun. 2, 2015;9038:207-20.

\* cited by examiner

EVENT-DRIVEN MONITORING OF RESOURCES IN A CLOUD COMPUTING ENVIRONMENT

CROSS-REFERENCE TO RELATED APPLICATIONS

This application claims the benefit of priority under 35 U.S.C. § 119 to U.S. Provisional Patent Application Ser. No. 63/423,890, filed on Nov. 9, 2022, titled "EVENT DRIVEN HARVESTING IN CLOUD ENVIRONMENTS" and U.S. Provisional Patent Application Ser. No. 63/460,576, filed on Apr. 19, 2023, titled "EVENT-DRIVEN MONITORING OF RESOURCES IN A CLOUD ENVIRONMENT," each of which is incorporated by reference herein in its entirety.

BACKGROUND

Cloud computing enables the delivery of software, data, and other computing resources to remote devices and computing locations. A cloud computing environment may contain many physical and virtual resources which communicate via various computer network protocols. The physical and virtual resources may host various data and software applications. Providing security in a cloud computing environment is important for protecting the data, software applications, virtual resources, physical resources, and other infrastructure of the cloud computing environment.

Cloud computing security is important to provide in various types of cloud computing environments including private cloud computing environments (e.g., cloud infrastructure operated for one organization), public cloud computing environments (e.g., cloud infrastructure made available for use by others, for example, over the Internet or any other network, e.g., via subscription, to multiple organizations), a hybrid cloud computing environment (a combination of publicly-accessible and private infrastructure) and/or in any other type of cloud computing environment. Non-limiting examples of cloud computing environments include GOOGLE Cloud Platform (GCP), ORACLE Cloud Infrastructure (OCI), AMAZON Web Services (AWS), IBM Cloud, and MICROSOFT Azure.

SUMMARY

Some embodiments provide for a method for event driven harvesting of data in one or more cloud computing environments, the method including: using at least one computer hardware processor to perform: obtaining, from a first cloud computing environment, first data related to a first event that occurred in the first cloud computing environment, the first event relating to a first resource in the first cloud computing environment, the first data including a first identifier for the first event; in response to obtaining the first data, requesting, from an application programming interface (API) of the first cloud computing environment and using the first identifier, first supplemental data about the first event that occurred in the first cloud computing environment, the first supplemental data including supplemental information about the first event and/or information about impact of the first event on the first resource; determining whether a security action is to be taken at least in part by analyzing the first data and/or the first supplemental data; and when it is determined a security action is to be taken, performing the security action.

Some embodiments provide for a system for event-driven harvesting of data in one or more cloud computing environments, the system including: at least one computer hardware processor; and at least one non-transitory computer-readable storage medium storing processor-executable instructions that, when executed by the at least one computer hardware processor, cause the at least one computer hardware processor to perform a method comprising: obtaining, from a first cloud computing environment, first data related to a first event that occurred in the first cloud computing environment, the first event relating to a first resource in the first cloud computing environment, the first data including a first identifier for the first event; in response to obtaining the first data, requesting, from an application programming interface (API) of the first cloud computing environment and using the first identifier, first supplemental data about the first event that occurred in the first cloud computing environment, the first supplemental data including supplemental information about the first event and/or information about impact of the first event on the first resource; determining whether a security action is to be taken at least in part by analyzing the first data and/or the first supplemental data; and when it is determined a security action is to be taken, performing the security action.

Some embodiments provide for at least one non-transitory computer-readable storage medium storing processor-executable instructions that, when executed by at least one computer hardware processor, cause the at least one computer hardware processor to perform a method comprising: obtaining, from a first cloud computing environment, first data related to a first event that occurred in the first cloud computing environment, the first event relating to a first resource in the first cloud computing environment, the first data including a first identifier for the first event; in response to obtaining the first data, requesting, from an application programming interface (API) of the first cloud computing environment and using the first identifier, first supplemental data about the first event that occurred in the first cloud computing environment, the first supplemental data including supplemental information about the first event and/or information about impact of the first event on the first resource; determining whether a security action is to be taken at least in part by analyzing the first data and/or the first supplemental data; and when it is determined a security action is to be taken, performing the security action.

In some embodiments, the method further includes: obtaining, from a second cloud computing environment, different from the first cloud computing environment, second data related to a second event that occurred in the second cloud computing environment, the second event relating to a second resource in the second cloud computing environment, the second data including a second identifier for the second event; in response to obtaining the second data, requesting, from an application programming interface (API) of the second cloud computing environment and using the second identifier, second supplemental data about the second event that occurred in the second cloud computing environment, the second supplemental data including supplemental information about the second event and/or information about impact of the second event on the second resource; determining whether a second security action is to be taken at least in by analyzing the second data and the second supplemental data; and when it is determined a second security action is to be taken, performing the security action.

In some embodiments the method includes after obtaining the first data and the first supplemental data, generating a first data structure; and storing the first data and the first supplemental data in the first data structure; and after obtaining the second data and the second supplemental data, generating a second data structure; and storing the second data and the second supplemental data in the second data structure, wherein the first data structure and the second data structure are a same type of data structure.

In some embodiments the method includes in response to obtaining the first data, determining whether the first supplemental data is to be requested, and requesting the first supplemental data in response to determining the first supplemental data is to be requested. In some embodiments, the method includes before the requesting, generating a first data structure having a field indicating the first supplemental data is to be requested; and storing the first data in the first data structure. In some embodiments, the method includes, before the requesting, storing a job associated with the first data structure in a queue, the queue storing jobs to be performed including scheduled data collections; and prioritizing the job associated with the first data structure within the queue to be addressed before the scheduled data collections, in response to determining the first supplemental data is to be requested. In some embodiments, determining whether a security action is to be taken comprises identifying a particular security action that is to be taken using the first data and first supplemental data, and performing the security action comprises performing the particular security action.

In some embodiments, the first cloud computing environment is an Amazon Web Services (AWS) cloud computing environment, an IBM cloud computing environment, a GOOGLE Cloud Platform (GCP) cloud computing environment, an ORACLE Cloud Infrastructure (OCI) cloud computing environment, or a MICROSOFT Azure cloud computing environment.

In some embodiments, information about the impact of the first event on the first resource comprises information about changes to an amount of storage associated with the first resource. In some embodiments, information about the impact of the first event on the first resource comprises information about changes to metadata associated with the first resource. In some embodiments, information about changes to metadata associated with the first resource comprises information about changes to a structure of data within the first resource, changes to software installed on the first resource, changes to permissions for accessing the first resource, and/or changes to security rules relating to the first resource. In some embodiments, the requesting comprises requesting a snapshot of data contained within storage associated with the first resource.

In some embodiments, performing the security action comprises performing at least one of: updating software installed in the first resource, changing a network configuration of the first resource, changing a configuration of one or more software applications executing on the first resource, changing a configuration of an operating system executing on the first resource, changing one or more permissions for the first resource, deleting malware from the first resource, removing corrupted files or data from the first resource, taking the first resource offline, killing an instance of the first resource, and/or blocking communications to and/or from the first resource. In some embodiments, analyzing the first data and the first supplemental data comprises identifying presence of one or more software bugs, one or more out-of-date software applications, one or more unpatched software applications, corrupted data, unencrypted data, one or more improper access permissions for the first resource, one or more misconfigurations, one or more computer viruses, and/or malware within the first data and the first supplemental data.

In some embodiments, the first data is obtained from a queue managed within the first cloud computing environment, the first data is pushed to the queue from a log of the cloud computing environment. In some embodiments, the first cloud computing environment is an AWS cloud computing environment, the first data is obtained from AWS Cloud Trail, and the requesting comprises requesting a snapshot of data contained within storage attached to the first resource. In some embodiments, the first cloud computing environment is an Azure cloud computing environment, the first data is obtained from an event grid subscription, and the requesting comprises requesting the first supplemental data from a resource API associated with the first cloud computing environment. In some embodiments, requesting the first supplemental data from the resource API associated with the first cloud computing environment comprises querying the resource API for information associated with the first resource and collecting information related to the impact of the first event on the first resource.

In some embodiments, the first data and/or the supplemental data includes an event type of the first event; and the method further comprises: in response to determining, based on the event type, the first event is associated with allocation of storage to the first resource, taking a snapshot of storage attached to the first resource. In some embodiments, the first cloud computing environment is an AWS cloud computing environment, and taking the snapshot is performed in response to determining the first event is an Attach Volume event type. In some embodiments, the first cloud computing environment is an Azure cloud computing environment, and the first cloud computing event is a Start Virtual Machine event. In some embodiments, the first cloud computing environment is a Google Cloud Platform cloud computing environment, and the first event is an Asset Change event.

Some embodiments provide for a method for event-driven monitoring of resources in a cloud computing environment, the method comprising: using at least one computer hardware processor to perform: obtaining, from a cloud computing environment, information about at least one cloud computing event; determining, using the information obtained from the cloud computing environment, whether the at least one cloud computing event is associated with allocation of storage for a virtual cloud computing resource; in response to determining that the at least one cloud computing event is associated with allocation of storage to the virtual cloud computing resource, requesting data from the storage allocated to the virtual cloud computing resource; and analyzing the data to detect presence of one or more security risks.

Some embodiments provide for a system for event-driven monitoring of resources in a cloud computing environment, the system comprising: at least one computer hardware processor; and at least one non-transitory computer-readable storage medium storing processor-executable instructions that, when executed by the at least one computer hardware processor, cause the at least one computer hardware processor to perform a method comprising: obtaining, from a cloud computing environment, information about at least one cloud computing event; determining, using the information obtained from the cloud computing environment, whether the at least one cloud computing event is associated with allocation of storage for a virtual cloud computing resource; in response to determining that the at least one cloud computing event is associated with allocation of storage to the virtual cloud computing resource, requesting data from the storage allocated to the virtual cloud computing resource; and analyzing the data to detect presence of one or more security risks.

Some embodiments provide for at least one non-transitory computer-readable storage medium storing processor-executable instructions that, when executed by the at least one computer hardware processor, cause the at least one computer hardware processor to perform a method comprising: obtaining, from a cloud computing environment, information about at least one cloud computing event; determining, using the information obtained from the cloud computing environment, whether the at least one cloud computing event is associated with allocation of storage for a virtual cloud computing resource; in response to determining that the at least one cloud computing event is associated with allocation of storage to the virtual cloud computing resource, requesting data from the storage allocated to the virtual cloud computing resource; and analyzing the data to detect presence of one or more security risks.

In some embodiments, the at least one cloud computing event comprises a first cloud computing event, and wherein obtaining, from the cloud computing environment, information about at least one cloud computing event comprises obtaining information about features including a time at which the first cloud computing event occurred, an event type for the first cloud computing event, one or more unique event identifiers for the first cloud computing event, storage associated with the cloud computing event, and a virtual cloud computing resource associated with the first cloud computing event.

In some embodiments, requesting the data from the storage allocated to the virtual cloud computing resource is performed in response to determining that a first cloud computing event is associated with allocation of storage for a virtual cloud computing service, and wherein the first cloud computing event is associating the storage with the virtual cloud computing resource.

In some embodiments, the cloud computing environment is an Amazon Web Services cloud computing environment, and the first cloud computing event is an Attach Volume event. In some embodiments, the cloud computing environment is an Azure cloud computing environment, and the first cloud computing event is a Start Virtual Machine event. In some embodiments, the cloud computing environment is a Google Cloud Platform cloud computing environment, and the first event is an Asset Change event.

In some embodiments, requesting the data from the storage allocated to the virtual cloud computing resource is performed in response to determining that two cloud computing events are associated with allocation of storage for a virtual cloud computing service, and the two computing events are: allocating storage in the cloud computing environment, and associating the allocated storage with the virtual cloud computing resource. In some embodiments, the cloud computing environment is an Amazon Web Services cloud computing environment, the two computing events are a Create Volume event and an Attach Volume event.

In some embodiments, obtaining, from the cloud computing environment, information about the at least one cloud computing event comprises: accessing a log of cloud computing events within the cloud computing environment, and obtaining information about the at least one cloud computing event from the log. In some embodiments, the log is one of an Amazon Web Services CloudTrail, a Google Cloud Platform Cloud Asset Inventory Stream, or an Azure Platform Activity Log.

In some embodiments, requesting the data from the storage allocated to the virtual cloud computing resource comprises taking a snapshot of the storage. In some embodiments, requesting the data from the storage allocated to the virtual cloud computing resource occurs within a threshold amount of time of determining that the at least one cloud computing event is associated with allocation of storage to the virtual cloud computing resource.

In some embodiments, the method includes when it is detected that the one or more security risks are present within the data, recommending one or more respective corrective actions to address the one or more security risks. In some embodiments, the method includes when it is detected that the one or more security risks are present within the data, performing one or more respective corrective actions to address the one or more security risks.

In some embodiments, performing respective corrective actions comprises performing at least one of: updating software installed in the virtual cloud computing resource, changing a network configuration of the virtual cloud computing resource, changing a configuration of one or more software applications executing on the virtual cloud computing resource, changing a configuration of an operating system executing on the virtual cloud computing resource, changing one or more permissions for the virtual cloud computing resource, deleting malware from the virtual cloud computing resource, removing corrupted files or data from the virtual cloud computing resource, taking the virtual cloud computing resource offline, killing an instance of the virtual cloud computing resource, and/or blocking communications to and/or from the virtual cloud computing resource. In some embodiments, analyzing the data to detect presence of one or more security risks comprises identifying the presence of one or more software bugs, one or more out-of-date software applications, one or more unpatched software applications, corrupted data, unencrypted data, one or more improper access permissions for resources, one or more misconfigurations, one or more computer viruses, and/or malware within the data.

In some embodiments, the cloud computing environment is an Amazon Web Services (AWS) cloud computing environment, an IBM cloud computing environment, a GOOGLE Cloud Platform (GCP) cloud computing environment, an ORACLE Cloud Infrastructure (OCI) cloud computing environment, or a MICROSOFT Azure cloud computing environment.

In some embodiments, the at least one cloud computing event comprises a first event, obtaining, from the cloud computing environment, information about the at least one cloud computing event comprises: obtaining, from the cloud computing environment, first data related to the first event that occurred in the cloud computing environment, the first event relating to a first resource in the cloud computing environment, the first data including a first identifier for the first even; and in response to obtaining the first data, requesting, from an application programming interface (API) of the cloud computing environment and using the first identifier, supplemental data about the first event, the supplemental data including supplemental information about the first event and/or information about impact of the first event on the first resource. In some embodiments, information about the impact of the first event on the first resource comprises information about changes to an amount of storage associated with the first resource and information about changes to metadata associated with the first resource, and wherein information about changes to metadata associated with the first resource comprises information about changes to a structure of data within the first resource, changes to software installed on the first resource, changes to permissions for accessing the first resource, and/or changes to security rules relating to the first resource.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1:
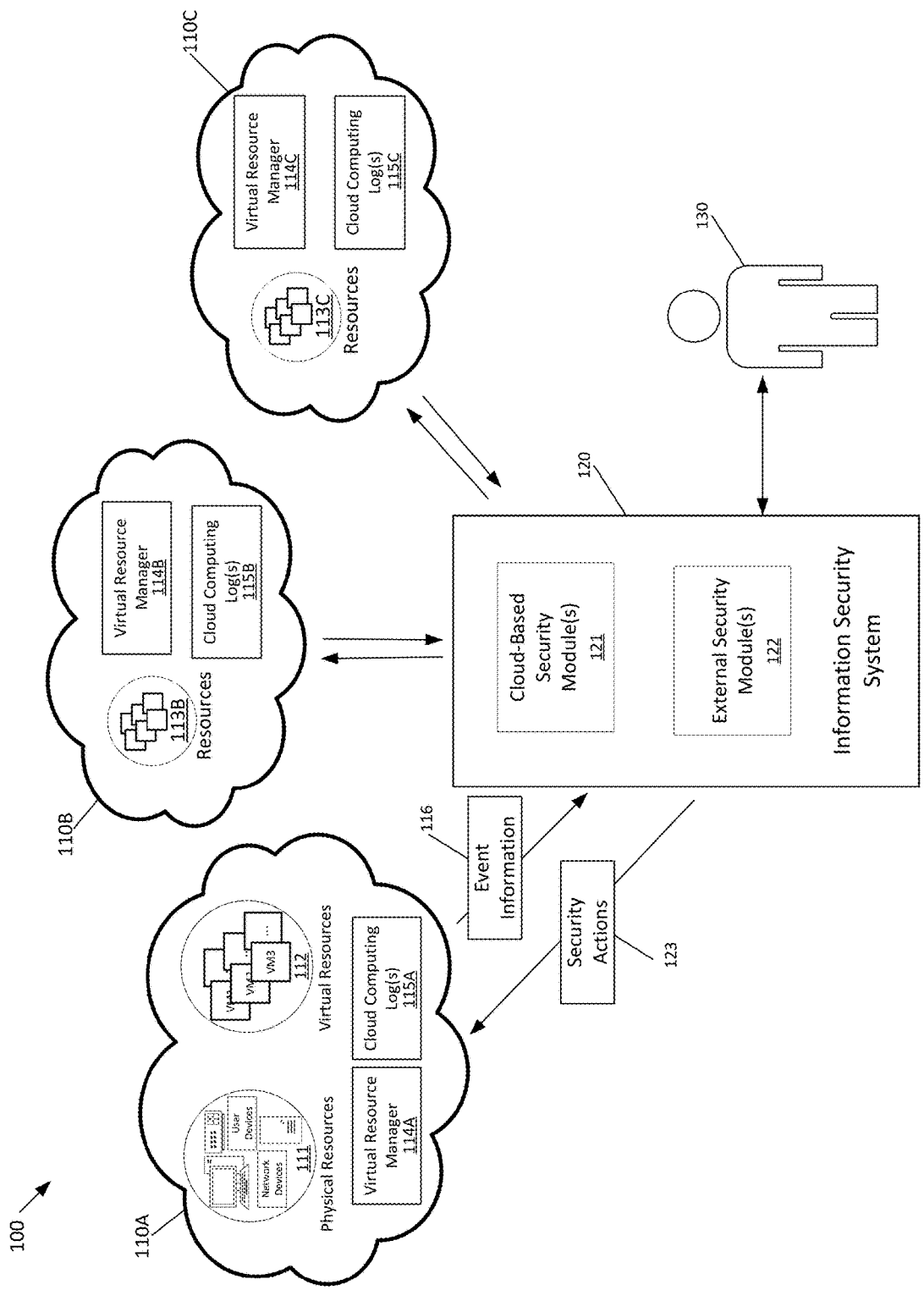
FIG. 1 shows an illustrative environment 100 in which an information security system may operate, in accordance with some embodiments of the technology described herein.

As described above, it is important to provide security in the context of cloud computing to protect the data, software, and infrastructure in cloud computing environments. One aspect of providing cloud computing environment security is monitoring the activity occurring within a cloud computing environment to detect potential security vulnerabilities (e.g., malware, viruses, outdated or not-up-to-date software, misconfigurations, etc.) associated with various resources (e.g., physical, and virtual resources) within the cloud computing environment. Monitoring activity associated with physical and/or virtual resources within a cloud computing environment may involve obtaining data about cloud computing events that have occurred in the cloud computing environment and analyzing such data to detect and mitigate potential security risks.

The inventors have recognized that conventional techniques for monitoring physical and virtual resources within a cloud computing environment may be improved upon. Conventional monitoring techniques pull data associated with a cloud computing resources according to a predefined schedule. For example, conventional monitoring techniques involve collecting snapshots of the data stored by or attached to cloud computing resources according to a predefined schedule. This may involve, for example, taking a full snapshot of every virtual machine (e.g., downloading the contents of the entire "disk" of a virtual machine at a specific point in time) in a cloud computing environment, transferring these data for subsequent analysis, storing these data, and finally analyzing these data for the presence of security risks, all according to a set schedule. When monitoring security risks for a cloud deployment for a particular company (e.g., a medium or large enterprise), each such collection frequently involves transmission, storage, and analysis of a voluminous amount of data (e.g., gigabytes to terabytes of data at every collection cycle) and therefore requires significant time and computational resources to perform. Such conventional methods of analyzing cloud computing resources according to a set schedule can allow malicious activity within one or more resources to go unnoticed between successive analyses of resources and therefore leave the cloud computing environment exposed to potential security risks and threats.

Accordingly, the inventors have developed new techniques for event driven harvesting of data from cloud computing environments. A particular event of interest may be detected as having occurred in a cloud computing environment, and data related to the particular event may be obtained in response to detecting that the particular event has occurred. In turn, the obtained data may be analyzed to determine whether any security risk is present and, when it is determined that a security risk is present, one or more actions may be taken to mitigate (e.g., reduce or eliminate) the security risk. As such, the security techniques described herein may operate in an event-driven manner (e.g., responsive to the occurrence of certain types of events in the cloud computing environment).

In some embodiments, the security techniques developed by the inventors may involve obtaining data about a cloud computing event, requesting supplemental data about the cloud computing event from the cloud computing environment, and analyzing the data and supplemental data to determine a security action to be performed in response to the cloud computing event, such that security risks and threats may be analyzed and mitigated, for example, in real-time or near real-time (e.g., within seconds, within minutes). As a result of analyzing data related to cloud computing events, and unlike conventional monitoring techniques, the techniques developed by the inventors substantially reduce the amount of time before a cloud computing resource is analyzed after indications of one or more potential malicious activities, which directly improves cloud computing environment security.

The techniques developed by the inventors involve obtaining data about cloud computing events from one or more cloud computing environments. As described herein, a cloud computing environment may be an environment, account (e.g., a cloud service account) or subscription provided by a cloud service provider. Non-limiting examples of cloud computing environments include GOOGLE Cloud Platform (GCP), ORACLE Cloud Infrastructure (OCI), AMAZON Web Services (AWS), IBM Cloud, and MICROSOFT Azure.

The techniques developed by the inventors may be performed by an information security system (which may be sometimes termed as "cloud security service" or "cloud security application"). The information security system, which provides computer security services, for a cloud computing environment may be implemented entirely in the cloud computing environment, entirely outside of the cloud computing environment, or at least in part in the cloud computing environment and at least in part outside of the computing environment. Examples of various such implementations are described herein including with reference to FIGS. 1-5, 7, 8A-C, 10A-B, and 11. The information security system may include physical and/or virtual components and may function to determine security threats and/or risks present within a cloud computing environment. In some embodiments, an information security system may be configured to automatically perform security actions in response to identified security threats or risks in order to mitigate them.

The inventors have developed new technology for event driven harvesting of data related to cloud computing events. The technique involves obtaining (via one or more accounts, and/or logs of, a cloud computing environment) data related to an event that occurred in a cloud computing environment (e.g., AWS, GCP, Azure, IBM, Oracle cloud computing environment, etc.), the event relating to a resource in the cloud computing environment, the data including an identifier for the event (e.g., a unique event identifier, a resource identifier associated with a resource implicated by the event). In response to obtaining the data, the identifier for the event may be used to request supplemental data about the event from an application programming interface (API) (e.g., Resource Graph API in an Azure cloud computing environment, EventBridge in an AWS cloud computing environment, Cloud Asset Inventory (CAI) in a GCP cloud computing environment) of the cloud computing environment. The supplemental data includes information about the event (e.g., information about features of the event) and/or information about impact of the event on the resource (e.g., changes to the resource associated with the event, such as changes to data attached to the resource and/or changes to the metadata (changes to the structure of data within the first resource, changes to software installed on the first resource, changes to permissions for accessing the first resource, and/or changes to security rules relating to the first resource) of the resource). The technique may involve determining whether a security action is to be taken at least in part by analyzing the data and/or the supplemental data; and when it is determined a security action is to be taken, performing the security action (updating software installed in the first resource, changing a network configuration of the first resource, changing a configuration of one or more software applications executing on the first resource, changing a configuration of an operating system executing on the first resource, changing one or more permissions for the first resource, deleting malware from the first resource, removing corrupted files or data from the first resource, taking the first resource offline, killing an instance of the first resource, and/or blocking communications to and/or from the first resource).

In some embodiments, data is collected from multiple cloud computing environments, and supplemental data may be requested from the multiple cloud computing environments. In some embodiments, the data and supplemental data is stored in a data structure. Data and supplemental data from multiple events may be stored in respective data structures, each respective data structure having the same type of structure (e.g., having the same number and type of fields, storing the same data, and/or having the same format).

In some embodiments, the data is analyzed (e.g., based on features associated with the event, the resource associated with the event) to determine whether supplemental data is to be requested. In some embodiments, when it is determined that supplemental data is to be requested, a job associated with the data is pushed to a queue of jobs (e.g., processes to be performed by an information security system), and is prioritized (e.g., moved ahead of in the queue, moved to the front of the queue) over scheduled data collections (processes which an information security system performs at regular intervals).

Cloud Computing Environment Resources

In some embodiments, a "resource" (sometimes termed an "asset") of a cloud computing environment may refer to any object in the environment, whether physical or virtual, which may be monitored and data about which may be collected. For example, a cloud computing environment resource (or simply, "resource") may be a physical device part of the cloud computing environment (e.g., an addressable physical device), which may be referred to as a "physical resource." As another example, a cloud computing environment resource may be a virtual device part of the cloud computing environment (e.g., an addressable virtual device), which may be referred to as a "virtual resource." Additional non-limiting examples of cloud computing environment resources include storage resources (e.g., AWS S3 bucket), a queue (e.g., a cloud computing queue whose state may be accessed by an API call to a cloud service), and/or any other type of data structure, in-memory object, software, and/or hardware, which may be monitored and data about which may be collected.

Examples of physical resources in a cloud computing environment include any network-enabled physical device including any network-enabled portable device and any network-enabled fixed device. Non-limiting examples of a network-enabled fixed device include a desktop computer, a rack-mounted computer, a server, a network switch, a network router, repeater, or any other network-enabled piece of equipment (e.g., a printer, scanner, a peripheral, etc.). Non-limiting examples of network-enabled portable devices include a smartphone, a smartwatch, a tablet computer, a laptop, a speaker, or any other suitable network-enabled mobile device. Examples of virtual resources in a cloud computing environment include virtual machines, containers, or any other type of virtual device. A virtual machine may virtualize an entire machine down to the hardware layers. A container may virtualize only software layers above the operating system level.

Resources part of the cloud computing environment may be interconnected by one or more computer networks and each resource may have one or more addresses on the computer network(s). Each address may be of any suitable type and may be used to enable communication to/from a resource on the computer network(s). Non-limiting examples of addresses include an IP address (e.g., an IPv4 or an IPv6 address), a MAC address, an FTP address, an HTTP address, and a hostname. As can be appreciated from the foregoing, when a resource has multiple addresses, different addresses may be used to enable communication to/from the resource using different communication protocols. Though, some communication protocols may require use of multiple addresses (e.g., IP address and MAC address). Some types of addresses may be assigned by a computer network (e.g., an IP address). Other types of addresses are not assigned by the network and are particular to a device (e.g., a MAC address).

Cloud Computing Events

The techniques developed by the inventors involve obtaining cloud computing event data from one or more cloud computing environments. The cloud computing event data may be obtained by establishing one or more connections to a cloud computing environment. For example, cloud computing event data may be obtained by actively querying one or more cloud computing APIs, monitoring logs, and the like. As another example, cloud computing event data may be obtained, for example, via an account service (e.g., an event subscription service) through which notifications regarding occurrence of certain types (or all types) of events may be provided. Aspects of obtaining cloud computing event data are further described below in the section called "Obtaining Cloud Computing Event Data"

An event may be any set of one or more things that occurred in a cloud computing environment in relation to one or more cloud computing environment resources. Non-limiting examples of events include: change to data stored in a resource, change to configuration of (e.g. permissions governing access to) a resource, launch of a resource (e.g., launching of a virtual machine), termination of a resource, access (e.g., read and/or write access) to a resource, allocation of storage to the cloud computing environment (e.g., an S3 bucket), attachment of storage to a cloud computing resource, addition of a user to a cloud computing environment, change of security permissions relating to one or more users of the cloud computing environment, start or completion of execution of one or more processes within the cloud computing environment, connection to the cloud computing environment, updating one or more parameters of the cloud computing environment, creation of one or more rules within the cloud computing environment.

In some embodiments, cloud computing environments generate and/or store data related to one or more events which have occurred within the cloud computing environment. The data may be stored in a log of the cloud computing environment, and/or may be maintained in a queue within the cloud computing environment. The cloud computing event data may be obtained from an account, queue, or log of a cloud computing environment, as described herein.

In some embodiments, cloud computing event data may include information such as one or more features related to the cloud computing events. Event information may include an event type, which may provide an indication of the changes or activity which occurred within the cloud computing environment. The event information may additionally include an event time which provides an indication of the time an event occurred. For example, a cloud computing event may have a create time if the event is associated with the creation of a volume of storage, or a cloud computing event may have an attach time if the cloud computing event is associated with the attachment of storage to a cloud computing resource. The information stored within the cloud computing environment may additionally include a unique event identifier which can distinguish the information about a particular event from information about other events. The information stored within the cloud computing environment may additionally include the cloud computing resource associated with the event, indicating which cloud computing resource the event occurred on or within. An identifier of an associated volume of storage may additionally be in the information about an event. A size of a volume of storage may be included in the information about an event. An event status may also be provided in the information about an event, for example if the event is related to the creation of a volume of storage the status may be creating or if the event is related to the attaching of a volume of storage the status may be attaching. Information about a cloud computing event may also include information about a type of volume associated with the event, for example a general purpose Solid State Drive (SSD) backed volume may have a volume type gp2, while a Provisioned Input/Output Operations per Second (IOPS) SSD backed volume may have a volume type i02. The information stored within the cloud computing environment may also include an IOPS value indicative of the input/output operations per second associated with the event. The information stored within the cloud computing environment may also include an encryption status, for example true if information or actions associated with the event are encrypted. The information associated with the event may also include an indication if a volume associated with the event is capable of attaching to multiple resources, for example true if the volume is capable of attaching to multiple resources. The information associated with the event may also include a device associated with the event. The information associated with the event may also include a zone associated with the event for example a zone may correlate to a geographical region associated with the event.

Additional features related to cloud computing events stored within the cloud computing environment may include: an event version, a user identity, a user type, a user resource name, a user account identity, a user principal identity, a user access key identity, a session context, a session issuer, a session type, a session principal identity, a session resource name, a session account identity, a session user name, web identity federation data, a creation date, a multi factor authentication status, ec2 role delivery status, an event source, an event source IP address, a user agent, a request parameter, a request size, a request zone, a request volume type, a request input/output operations per second, a request encryption, response elements, a response request identity, a response volume identity, a response size, a response zone, a response status, a response create time, a response volume type, a response input/output operations per second, response encryption status, a response tag set, a response multi attach status, a request identity, an event identity, an event type, a read only status, a management event status, a recipient account identity, a virtual private cloud endpoint identity, an event category, transport layer security details, a transport layer security version, cipher suite information, a transport layer security client provided host header, an auto delete status, boot information, a device name, a disk size, interface information, licenses, and a read/write mode.

Obtaining Cloud Computing Event Data

Information about one or more events that have taken place in a cloud computing environment may be obtained in numerous ways. For example, information about cloud computing events may be obtained through one or more accounts within a cloud computing environment, and/or from logs of a cloud computing environment.

In some embodiments, the information about events may be obtained from one or more accounts within the cloud computing environment. The accounts allow for the collection of information related to specific events which have occurred within the cloud computing environment. In some embodiments, the accounts may be tied to a cloud computing log, as described herein. In some embodiments, the accounts may be tied to a particular service of a cloud computing environment.

Figure 2:
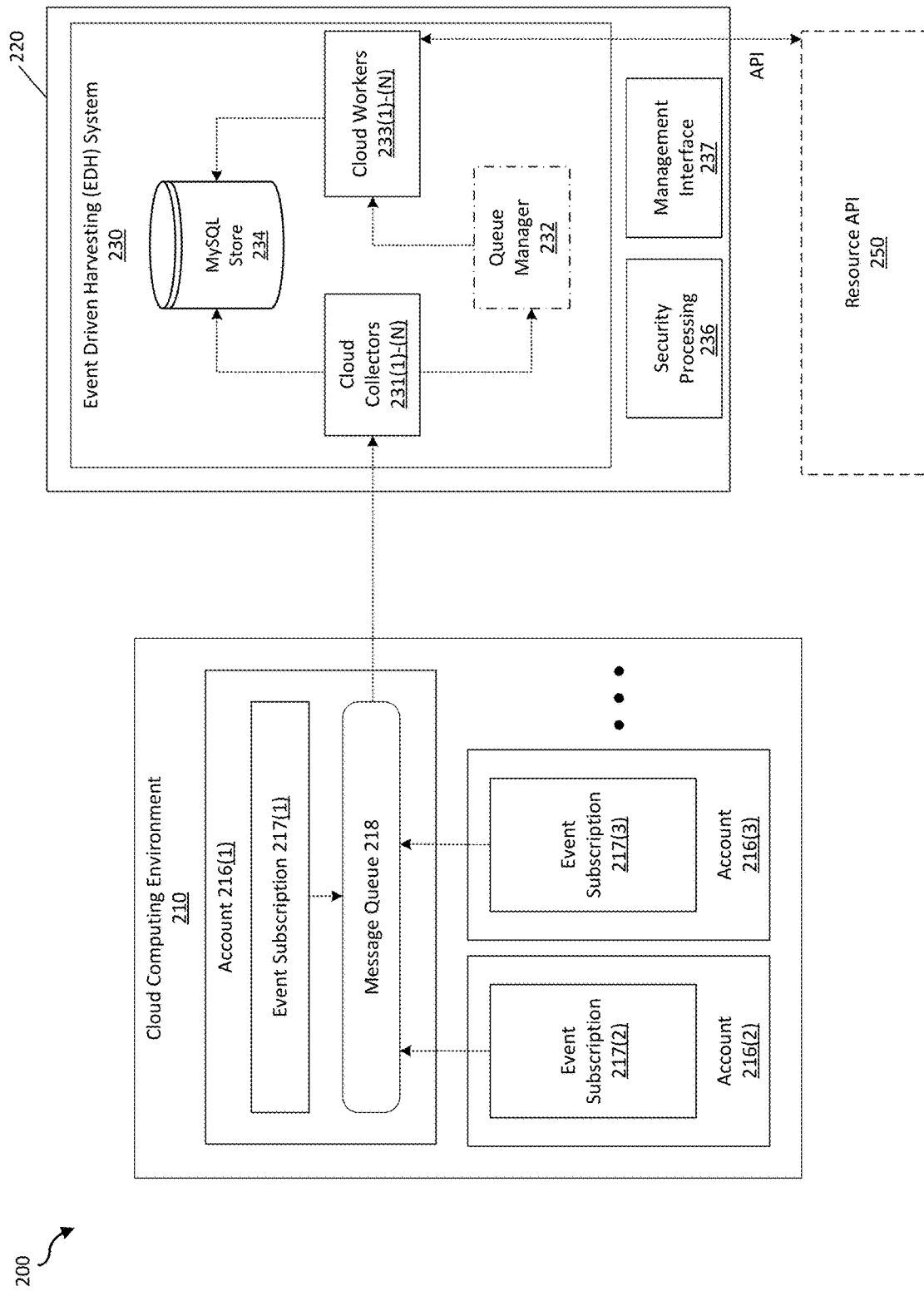
FIG. 2 is a block diagram 200 of a cloud computing service that implements an event subscription and is communicatively coupled to an Event Driven Harvesting (EDH) computing system that implements a cloud security application, in accordance with some embodiments of the technology described herein.

In some embodiments, cloud computing accounts may implement event subscriptions. An event subscription (e.g., an Event Grid Subscription in an Azure cloud computing environment) tells an event broker or event handler (e.g., like Azure Event Grid, among others) which events on a topic are of interest (e.g., to be received or "ingested" for processing and security analysis). Event brokers or handlers provide message delivery at scale and can be used as fully managed services on cloud-implemented clusters. In some embodiments, when creating event subscription(s) (e.g., event subscriptions 217(1), 217(2), 217(3), and so on as shown in FIG. 2), an endpoint is provided for handling the event. Events sent to the endpoint can be filtered (e.g., by event type or event subject). The endpoint(s), as shown in FIG. 2, are accounts 216(1), 216(2), 216(3), and so on. An account can be tied to different filters. For example, a single cloud computing environment can include multiple accounts, where each account is tied to a partition of cloud resources within that cloud computing environment. Accounts and/or event subscriptions may obtain information about cloud computing events from the cloud computing environment activity directly or from one or more cloud computing logs.

In some embodiments, event driven harvesting (EDH) may operate based on a relationship between a Producer and Consumer. Event data is pulled out of computing environment accounts (e.g., Azure subscriptions) with a Message Queue (e.g., message queue 218 as shown in FIG. 2, a Service Bus Queue in an Azure cloud computing environment, a SQS Queue in an AWS cloud computing environment, or Pub/Sub in a GCP cloud computing environment). In this example, if a given event subscription has a queue (that follows a specific naming convention), an event driven harvesting system automatically labels the event subscription as an EDH consumer. In some embodiments, a queue (e.g., message queue 218) is a method and data structure and/or construct for getting events out of the event subscription and into an EDH system, a consumer (e.g., an EDH consumer) is an event subscription that contains a queue (like message queue 218 of FIG. 2), a producer is an event configuration that sends events to the queue, and credentials (such as ServiceApp Principle) may be used to pull events from the queue. An EDH system may pull data from cloud computing environment into a central queue like message queue 218 to provide near real time updates on the state of cloud resources within a cloud computing environment (e.g., cloud computing environment 110A).

The information about events related to the cloud resources may be obtained from one or more logs withing the cloud computing environments. In some embodiments, a log of a cloud computing environment may contain information about events which have occurred within the cloud computing environment.

In some embodiments, the cloud computing logs are logs of a specific cloud computing environment. For example, in an Amazon Web Services (AWS) Cloud the cloud computing log(s) may be an AWS "CloudTrail" log. For example, in a Google Cloud Platform (GCP) Cloud the cloud computing log(s) may be a "Cloud Asset Inventory (CAI) Event Stream". For example, in an Azure cloud, the one or more log(s) may be an "Azure Security Logging and Auditing log" and/or an "Azure platform activity log".

Supplemental Data

In some embodiments, supplemental data may be requested from a cloud computing environment using a resource API of the cloud computing environment. The resource API may refer to an application programming interface through which information about one or more cloud computing environment resources may be obtained. In some embodiments, the resource API may be provided with information identifying one or more resource(s) and, in response, the resource API may provide supplemental data about the identified resource(s) to the requester. In some embodiments, in addition to information identifying resource(s), the resource API may be provided with specific types of information of interest (e.g., give examples) and may provide the requester with the requested data (rather than all data). One example of a resource API is the Azure Resource Graph, which may be used to obtain data about resource(s) in an Azure cloud computing environment.

In some embodiments, the information obtained about cloud computing events contains a limited number of features and may not contain sufficient information to analyze the cloud computing event. In such examples, security risks to address or actions to perform based on the cloud computing event may not be determined. Therefore, the information associated with the cloud computing event may be enriched with supplemental data from the cloud computing environments. For example, the information obtained from the cloud computing environment may include information on an identifier of the event and the resource associated with the event, while supplemental information on the resource or impact of the event on the resource may be used to properly analyze the event. The supplemental information which was not originally obtained may be requested from the cloud computing environment. In some embodiments, supplemental information related to the cloud computing event may be requested from the cloud computing environment, such as a snapshot of the cloud computing resource associated with the cloud computing environment.

In some embodiments, the supplemental data may include features of the cloud computing event not originally obtained, examples of feature are provided herein. In some embodiments, the supplemental data may include information about changes to a resource associated with the event, for example, changes to the metadata of the resource such as changes to the structure of data within the first resource, changes to software installed on the first resource (e.g., new software downloaded, software version changes, new software active), changes to permissions for accessing (e.g., creating, reading, writing, and/or modifying) the first resource, or changes to security rules relating to the first resource. In some embodiments, the supplemental data may include data stored in storage attached to the resource associated with the event.

In some embodiments, information related to cloud computing events is obtained from different cloud computing environments. For example, information may be obtained from the AWS cloud computing environment, Azure cloud computing environment, Oracle cloud computing environment and GCP cloud computing environment. Different cloud computing environments may provide different amounts of information related to cloud computing events. For example, information about different features or a different number of features may be obtained. The information about different features of cloud computing events obtained from different cloud computing environments may result in different views of the cloud computing events and of cloud computing resources associated with the cloud computing events. Therefore, the information about cloud computing events obtained from different cloud computing environments may be enriched to have information on the same number and types of features for all cloud computing events. Enriching the information about cloud computing events may involve requesting supplemental data related to the cloud computing events from the cloud computing environment. For example, a first cloud computing environment may provide information about the time and the type of a cloud computing event, and a second cloud computing environment may provide information related to a time and a resource related to an event. The information about the cloud computing event from the first cloud computing environment may be enriched by requesting data about the resource related to the event, and the information about the cloud computing event from the second cloud computing environment may be enriched by requesting data about the type of the cloud computing event.

In some embodiments, the obtained event information may be used to generate a data structure for a cloud computing event. A data structure may be generated for each cloud computing event which information was received about. The data structures may be the same type of data structure, have the same number and type of data fields, may store the same data, and/or may have the same format as each other. In some embodiments, the data structure may include one or more processes which are to be performed, based on the associated cloud computing event, such as a work job.

Generating data structures of the same type for the event information and supplemental information obtained from cloud computing environments allows an information security system to analyze a unified view of cloud computing events from multiple sources. Therefore, the same analysis may be performed across different cloud computing environments (e.g., AWS, GCP, Oracle, and Azure) which provide varying levels of information about cloud computing events. Additionally, using the same type of data structure allows for the same analysis of cloud computing events which provide varying levels of information on features of the events. Performing the same security analysis across different cloud computing environments and events simplifies the processing performed by an information security system and allows an information security system to identify security risks faster and across a wide range of environments.

In some embodiments, information about cloud computing events may be filtered based on one or more features of the cloud computing event. For example, events may be filtered based on an event type, cloud computing resource associated with the event, and/or an event source, among other event features. The filters for cloud computing events may be selected so events which are more likely to be associated with malicious activity are properly identified. Events filtered based on their features may be analyzed and/or enriched differently from other events. For example, events determined to be associated with allocation of storage for a virtual cloud computing resource may be filtered from other cloud computing events. Events associated with the allocation of storage for a virtual cloud computing resource may indicate that the resource associated with the event should be inspected, in a timely manner, to determine whether the event was benign (as many will likely be) or whether there has been malicious activity and/or the resource may have been compromised. Therefore, in response to determining the at least one cloud computing event is associated with the allocation of storage to a virtual cloud computing resource, supplemental data requested from data in the storage allocated to the virtual cloud computing resource. The supplemental data may then be analyzed to detect the presence of one or more security risks. The supplemental data may be generated as a part of the enrichment of the event information or may be generated in response to analysis of enriched event information.

The inventors have also appreciated that specific cloud computing events are more likely to indicate malicious activity is occurring within a cloud computing environment. Accordingly, the inventors have provided embodiments of the technique, in which data associated with cloud computing resources is collected when certain types of events have occurred. Such event types may indicate new processes or activities are running within a cloud computing resource or the cloud computing resource now has increased capacity to run new processes or activities. Such events may include events related to allocating new storage to the cloud computing environment and attaching storage to a cloud computing resource or allocating new storage to a cloud computing resource. In some embodiments, a pair of events indicating new storage has been allocated to the cloud computing environment and the new storage has been attached to a cloud computing resource are indicative the cloud computing resource may be experiencing malicious activity or may contain one or more security risks or threats and may be used to filter the associated cloud computing events. In some embodiments, a single event indicating new storage has been allocated to a cloud computing resource is indicative the cloud computing resource may be experiencing malicious activity or may contain one or more security risks or threats and may be used to filter the associated cloud computing event.

In some embodiments, the cloud computing environment is an AWS cloud and an event type related to allocating new storage to the cloud computing environment is "Create Volume". In addition, an event type indicating new storage has been attached to a cloud computing resource is "Attach Volume".

In some embodiments, the cloud computing environment is a GCP cloud, and an event type which may indicate new storage has been allocated to a cloud computing resource is "Asset Change". It can be determined if new storage has been allocated to a cloud computing resource by analyzing the "disks" portion of the "resource" field of the information related to an "Asset Change" event.

In some embodiments, the cloud computing environment is an Azure cloud and an event type which may indicate new storage has been allocated to a cloud computing resource is "Start Virtual Machine". It can be determined if new storage has been allocated to a cloud computing resource via API queries about the disks associated with the "Start Virtual Machine" event.

In some embodiments, data contained within or attached to a cloud computing resource which may be experiencing malicious activity or may contain one or more security risks or threats, is collected in order to analyze the resource, based on cloud computing event(s) associated with the resource. The data may be collected as a part of the enrichment of the associated cloud computing event information or may be collected in response to analysis of enriched or unenriched cloud computing event information. The collection may be performed by harvesters of an information security system, as a part of an event driven harvesting process. In some embodiments, collection of data contained within or attached to a cloud computing resource is performed in response to particular cloud computing events. Such collection may involve, for example, taking a full snapshot of the resource (e.g., downloading the contents of the entire "disk" of a virtual machine at a specific point in time) or taking a partial snapshot of the resource (e.g., downloading the contents of a portion of the "disk" of a virtual machine at a specific point in time) in a cloud computing environment, transferring these data for subsequent analysis, storing these data, and finally analyzing these data for the presence of security risks.

In some embodiments, the techniques described herein may be used to analyze events and resources in any computer network environment. As one example, the techniques described herein may be used to analyze events and resources in a computer network that interconnects hundreds, thousands, millions, tens of millions, or even hundreds of millions of resources addressable on the computer network. For instance, an internal computer network of a large multinational business with tens of thousands of employees may interconnect millions or tens of millions of resources. Thus, the techniques described herein may be used to analyze events and resources in any suitable computer network environment (e.g., any private, public, or hybrid computer network environment having any suitable number of resources).

In some embodiments, security risks may be identified in data collected from cloud computing resources. Security risks may be identified based on supplemental data requested and/or harvested in response to cloud computing events. Examples of security risks include various vulnerabilities including, but not limited to, known software bugs, out-of-date software applications versions, unpatched software applications, corrupted data, unencrypted data, improper access permissions (e.g., permissions creating, reading, writing, and/or modifying resources), misconfigurations (e.g., settings that are incorrect or inconsistent with security policies such as network settings, software application settings, operating system settings, etc.), computer viruses, malware (e.g., adware, ransomware, spyware, trojans, bots, etc.), and/or any other security risks.

In some embodiments, corrective actions may be taken to address identified security risks within a given resource or cloud computing environment. Corrective actions may be performed automatically (e.g., by an information security system) or manually (e.g., by one or more system administrators). Non-limiting examples of corrective actions include updating software (e.g., by installing a newer version of the software, applying a patch), changing the network configuration of an resource, changing the configuration of one or more software applications executing on the resource, changing the configuration of an operating system executing on the resource, changing one or more permissions for the resource, deleting malware, removing corrupted files or data, taking a physical offline, killing an instance of a virtual resource, and blocking communications to and/or from the resource.

It should be appreciated that the techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1 shows an illustrative environment 100 in which an information security system may operate, in accordance with some embodiments of the technology described herein. The environment 100 includes cloud computing environments 110A, 110B and 110C and information security system 120.

The information security system 120 may be configured to provide information security services with respect to the cloud computing environments 110A-C. For example, the information security system 120 may monitor resources in the cloud computing environments 110A-C and may monitor cloud computing logs 114 within the cloud computing environment 110 for information about events related to specific resources. The information security system 120 may also receive information about cloud computing events via one or more accounts or other connections to cloud computing environments 110A-C.

In some embodiments, the information security system 120 may monitor the cloud computing environment for different types of security risks. Examples of security risks are provided herein. Additionally, or alternatively, the information security system 120 may monitor network traffic and may operate one or more firewalls, intrusion detection systems, and/or any other suitable cybersecurity applications.

The information security system 120 may not only may detect one or more types of security risks, but also may be configured to perform one or more actions to address any detected security risks. As one example, the information security system may notify one or more users (e.g., one or more administrators 130) about a security risk in response to detecting the security risk. Additionally, in some embodiments, the information security system 120 may be configured to recommend one or more actions that a user (e.g., one or more administrators 130) may take to address the security risk. One or more administrators 130 may interact with the information security system 120 to address any detected security risks. Additionally, or alternatively, the information security system may be configured to automatically address a security risk in response to detecting the security risk (e.g., by taking a potentially compromised resource offline, blocking one or multiple communications, reconfiguring a resource, for example its network configuration, installing an update to the software executing on the resource, deleting malware, removing corrupted files or data, etc.).

The information security system 120 may be implemented internal to the cloud computing environment, external to the cloud computing environment, or as a hybrid system, as shown in FIG. 1, where one or more software modules (e.g., cloud-based modules 121) are implemented within the cloud computing environment (e.g., as software on the physical infrastructure of the cloud computing environment) and one or more software modules (e.g., external modules 122) external to the cloud computing environment. For example, the cloud-based module(s) 121 may implement functionality relating to monitoring resources, monitoring cloud computing logs, collecting data from resources, and implementing specific actions, such as security actions 123, to address detected security risks. As another example, the external module(s) 122 may implement functionality for analyzing data related to cloud computing events, analyzing the data collected from resources, identifying any security risks to the cloud computing environment from the collected data, identifying one or more actions to take to address the security risks, and/or enabling administrator(s) to interact with the information security system 120.

As shown in FIG. 1, the cloud computing environment 110A includes physical resources 111, virtual resources 112, virtual resource manager 114A and cloud computing log(s) 115A. Examples of physical and virtual resources are provided herein. Virtual resource manager 114A may comprise software for managing virtual resources 112 (e.g., by launching, monitoring, allocating cloud resources to, shutting down VM instances). Though these are shown separately within FIG. 1, this is done for clarity of presentation, as virtual resources 112 and virtual resource manager 114A are software assets that execute on or more physical resources 111.

The cloud computing environment 110A may include any suitable number of resources of any suitable type. For example, physical resources 111 may include tens, hundreds, thousands, tens of thousands, hundreds of thousands, or millions, of addressable physical resources. As another example, virtual resources 112 may include tens, hundreds, thousands, tens of thousands, hundreds of thousands, millions, tens of millions, or hundreds of millions of virtual resources. As cloud computing services continue to evolve and develop, a cloud computing environment may include an even greater number of resources, and aspects of the technology described herein are not limited in this respect.

The cloud computing environment may include cloud computing log(s) 115A, which store data 116 related to events which have occurred within cloud computing environment 110A. Events recorded to log(s) 115A may include any activity which has occurred within cloud computing environment 110A, or In some embodiments, log(s) 115A may store information related to specific events which have occurred within the cloud computing environment 110A. Log(s) 115A may be any one of: an AWS "CloudTrail" log, a GCP "Cloud Asset Inventory (CAI) Event Stream," an "Azure Security Logging and Auditing log," an "Azure platform activity log," or a log provided by a different cloud computing provider.

Also shown in FIG. 1 are cloud computing environments 110B and 110C, which include resources 113B and 113C, virtual resource managers 114B and 114C, and cloud computing logs 115B and 115C, respectively. Resources 113B and 113C may include physical and virtual resources, as described herein.

FIG. 2 is a block diagram 200 of a cloud computing service that implements an event subscription and is communicatively coupled to an Event Driven Harvesting (EDH) computing system that implements a cloud security application, in accordance with some embodiments of the technology described herein. As shown in FIG. 2, a cloud computing environment 210 (e.g., Azure, AWS, GCP, and the like), includes accounts 216(1)-(N), each with one of event subscriptions 217(1)-(N), respectively. An account like account 216(1) can be tied to different filters or cloud computing environments. For example, a single cloud computing environment can have multiple accounts, where each account is tied to a partition of cloud resources within the cloud computing environment.

Event subscriptions 217(1)-(N) communicate to an event broker or event handler (e.g., like Azure Event Grid, among others) which events on a topic are of interest (e.g., to be received or "ingested" for processing and security analysis). Event brokers or handlers provide message delivery at scale and can be used as fully managed services on cloud-implemented clusters. In some embodiments, when creating event subscriptions 217(1), 217(2), 217(3), an endpoint is provided for handling the event. Event information sent to the endpoint can be filtered (e.g., by event type or event subject). The endpoint(s), as shown in FIG. 2, are accounts 216(1), 216(2), 216(3), and so on. As shown, a single account 216(1) includes a message queue 218 that receives messages from event subscriptions 217(1)-(N). In some embodiments, the message queue may be implemented external to accounts 216(1)-(N).

In one embodiment, message queue 218 is a managed message broker implemented on cloud computing environment 210. Message queue 218 can be configured with message queues that receive data from pre-subscribed services (e.g., event subscriptions 217(1), 217(2), and 217(3)). Messages are sent to and received from queues. Message queues store messages until the receiving application(s) (e.g., cloud workers 233(1)-(N)) are available to receive and process these messages. In some embodiments, a message is a modeled data container decorated (or supplemented or appended) with metadata. A message may contain information related to a cloud computing event. The data for use by EDH system 230 is sent from one or more event subscriptions 217(1)-(N) that are subscribed to cloud computing environment accounts whose activities are wished to be monitored by EDH system 230 (e.g., accounts 216(1)-(N)). In this example, a message is structured data that is encoded in multiple common formats (e.g., JavaScript Object Notation (JSON), among others).

Cloud computing environment 210 is communicatively coupled (e.g., via a network like the Internet, or any other type of network or interconnection) to an information security system 220, which contains an event driven harvesting (EDH) system, EDH system 230. EDH system 230 can be any type of computing system (e.g., physical, or virtual) and can be implemented on-premises (e.g., on an endpoint machine or a physical server), or can be implemented entirely in the "Cloud" (e.g., EDH system 230 can be part of cloud computing environment 210 or can be part of another cloud computing environment that is different than cloud computing environment 210).

EDH system 230 is also communicatively coupled to a resource API 250. As shown in FIG. 2, resource API 250 is implemented separately from cloud computing environment 210 and EDH system 230. However, resource API 250 can be part of EDH system 230, cloud computing environment 210 or another cloud computing environment. In one embodiment, resource API 250 is a service provided by cloud computing environment 210 and is configured to provide efficient and performant resource exploration with the ability to query at scale across a given set of accounts (e.g., over cloud resource fields such as resource name, ID, type, resource group, subscription, and location). Resource API 250 also permits calling individual resource providers for detailed properties one resource at a time without needing to make individual calls to each resource provider.

As shown in FIG. 2, EDH system 230 includes at least cloud collectors 231(1)-(N), cloud workers 233(1)-(N), a queue manager 232, and a MySQL store 234 (e.g., a database store). In one embodiment, a collector such as cloud collector 231(1) is a separate dedicated process that collects event information from cloud computing environment 210. Collecting involves interfacing with cloud computing environment 210 to connect and collect information about events that are of value for the harvesting. After the collection, the collector filters, groups, and transforms the event information for dedicated harvesters to consume (or ingest). In another embodiment, a worker such as cloud worker 233(1) is a multi-threaded processor that is in charge of executing jobs that are on queue manager 232 (e.g., a Python library for queueing jobs for background processing like Redis Queue, among others). Multiple workers (e.g., cloud workers 233(1)-(N)) can run concurrently to handle large(r) job backlogs.

In one embodiment, EDH system 230 permits near real time updates on the state of cloud resources managed by cloud computing environment 210. For example, EDH system 230 configures a collection process that involves generating message queue 218 to identify updates made to the state of such cloud resources. Message queue 218 is configured to receive one or more messages, containing cloud computing event information, from various event subscriptions 217(1)-(N). Accounts 216(1)-(N) represent a logical way to organize resources in a cloud computing environment. The messages pushed onto message queue 218 capture important state changes on the resource (e.g., removed, added, updated, and the like).

Next, in certain embodiments, the collector consumes these messages in batches at a high rate. During processing, the collector (e.g., cloud collector 231(1)) executes various actions on the messages including at least deduplication, aggregation, and enrichment. Once completed, jobs associated with the messages are pushed onto another queue provisioned by EDH system 230 (e.g., queue manager 232). As soon as the jobs associated with the messages are available on queue manager 232, dedicated harvesters (not shown in FIG. 2) capture these jobs and associated messages and leverage resource API 250's API to further enrich the data about these cloud resources. Upon completion, the cloud resource is updated for EDH system 230 for users to view, report, and remediate (e.g., via a user interface) or for security analysis by the information security system.

In some embodiments, once messages have been processed and grouped together by type of resource, they are sent to a dedicated harvester (not shown in FIG. 2, but part of EDH system 230). A harvester within EDH system 230 is a job that polls cloud APIs periodically to retrieve data about the current state of cloud resources. In this example, the dedicated harvester is called (or polled) for specific cloud resources that have been identified from event information processed by the collector, indicating that their state has been modified. The harvester retrieves the current state to be processed for an update on what has changed.

Advantageously, in certain embodiments, combining and leveraging the functionality of an event handler or an event broker implemented by cloud computing environment 210 with resource API 250 generates near real time results on cloud resource changes. What's more, in some embodiments, building, generating, and utilizing a dedicated collector (e.g., cloud collector 231(1)) to decouple collection and ingestion performed by traditional harvesting infrastructures significantly reduces the complexity of ingestion. By clearly separating collection and ingestion, EDH system 230 provides a clear separation of cloud security concerns in the cloud security pipeline.

Figure 3:
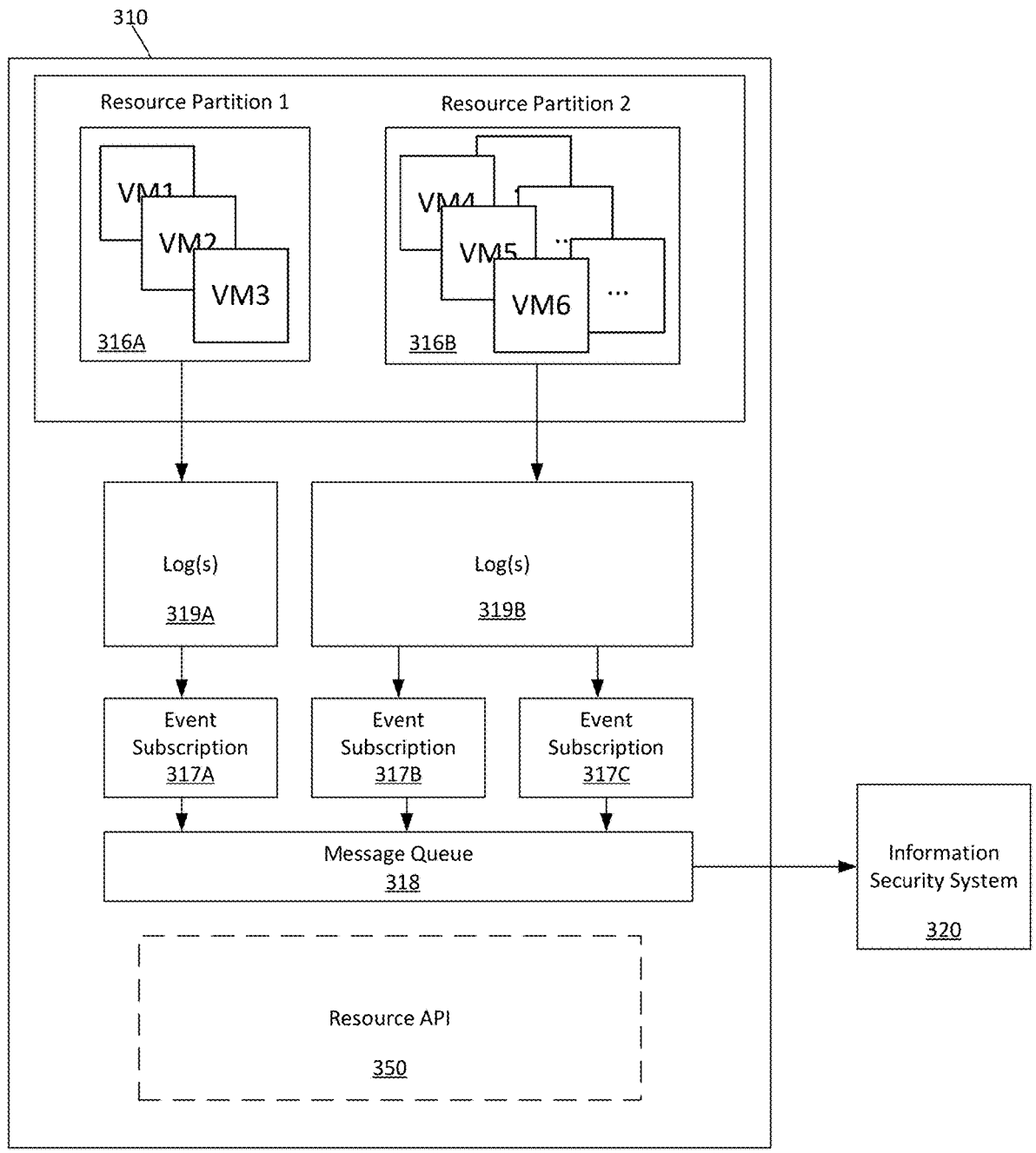
FIG. 3 is an example of a cloud computing environment, in accordance with some embodiments of the technology described herein.

FIG. 3 is an example of a cloud computing environment, in accordance with some embodiments of the technology described herein. Cloud computing environment 110 includes cloud computing resources 316, separated into two partitions, Resource Partition 1 which includes resources 316A, and Resource Partition 2 which includes resources 316B. As shown, cloud computing environment 310 includes two resource partitions, however any number of partitions may be included, for example one partition, three partitions, up to five partitions, up to 10 partitions, up to 50 partitions, or greater than 50 partitions.

In some embodiments, resources may be partitioned within a cloud computing environment, such as cloud computing environment 310 according to one or more aspects of the resources. Resources may be partitioned based on the type of resource, for example physical resources may be in a separate partition from virtual resources, addressable virtual resources may be partitioned separate from nonaddressable virtual resources. Resources may be portioned based on physical location, for example a first partition may include virtual resources supported by servers in a first location and a second partition may include virtual resources supported by servers in a second location. In addition, location-based partitions may be selected by a user of the cloud computing environment 310, for example the user may be a business with multiple offices and resources associated with a first office may be in a separate partition from resources associated with a second office. Other aspects of resources may be used to determine partitions, for example security importance of the resources, accounts associated with the resources, and users associated with the resources, among other aspects.

As cloud computing resources are changed, accessed, and modified during regular use, cloud computing event information is generated. Information about cloud computing events may be stored on cloud computing logs, such as logs 319A and 319B, as described herein. As shown, partitioned resources 316A and 316B has a respective log 319A and 319B. Logs 319A and 319B may be separate instances of the same type of log or may be different logs. In some embodiments, a single log may store event information related to cloud computing resources of cloud computing environment 310.

One or more event subscriptions 317 allow information related to cloud computing events to be obtained from the logs 319A and 319B. In some embodiments, information about specific cloud computing may be passed to a message queue 318, for transmission to information security system 320 for analysis. In some embodiments, the logs 319A and 319B may store information about all events within the cloud computing environment 310, and the event subscriptions 317 may be associated with specific event types, and therefore individual event subscriptions obtain certain events from logs 319A and 319B. For example, event subscriptions 317 may only obtain information about cloud computing events which may or are likely to introduce security risks into the cloud computing environment 310. Such events may include events related to launching a new resource, allocating new storage to a cloud computing resource, changing the permissions of a cloud computing resource, changing the security settings of a resource, changing access to the resource, and/or storing or accessing sensitive data stored within a resource, among other events. As shown, logs 319A have a single event subscription 317A, while logs 319B have multiple event subscriptions 317B and 317C. Each event subscription to log with multiple event subscriptions, such as 319B, may obtain information related to different types of events, determined based on features of the events. In some embodiments, a cloud computing environment, such as cloud computing environment 310 may include a single event subscription or may include a greater number of event subscriptions than those shown.

Also visible in FIG. 3 is resource API 350. Resource API 350 may store additional information related to cloud computing resources within the cloud computing environment 310 or may store information related to cloud computing events which have occurred within cloud computing environment 310. Resource API may be accessed by information security system 320 to access and analyze information about cloud computing events and resources, as described herein. Resource API 350 may be maintained within cloud computing environment 310, or external to cloud computing environment 310.

Figure 4:
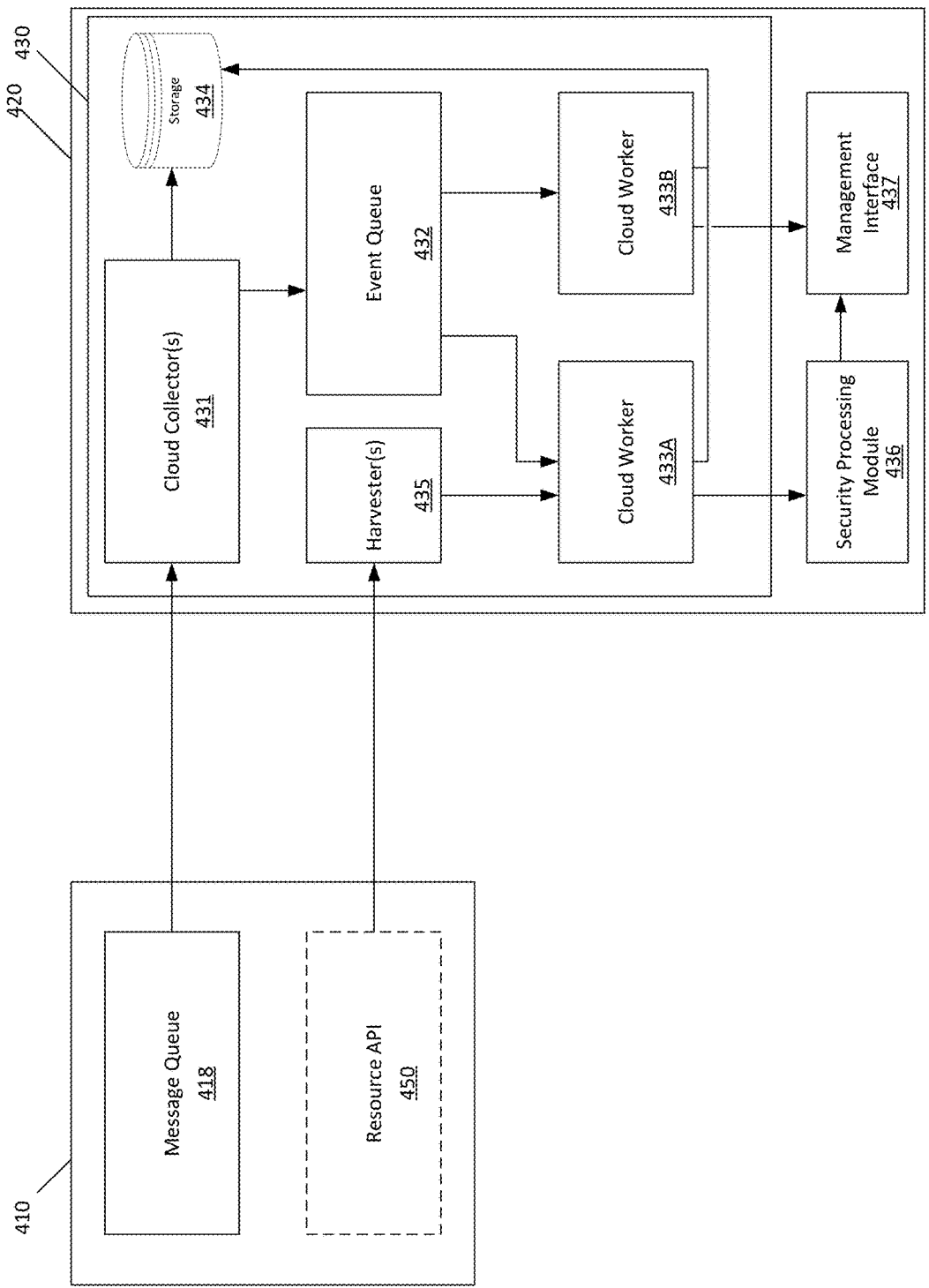
FIG. 4 illustrates an example of an information security system 420, in accordance with some embodiments of the technology described herein.

FIG. 4 illustrates an example of an information security system 420, in accordance with some embodiments of the technology described herein. The information security system 420 may include an EDH system 430, as described herein. The information security system 420 may include one or more cloud collectors 431 which obtain information about cloud computing events which have occurred within cloud computing environment 410. The cloud computing event information may be obtained from a message queue 418 of the cloud computing environment 410, as described herein.

The cloud collectors 431 may perform one or more operations on the collected cloud computing event information. The event information collectors may perform microbatching messages where a collector groups incoming messages into small groups per cycle; filtering, grouping, translating, and enriching messages into data structures and/or jobs associated with data structures such as work jobs or work job messages, as described herein; including metadata about actions to be performed by downstream process in the data structures (e.g., once messages are processed and a data structure is created, the downstream process in this example refers to the part of the application that receives the data structure and determines the correct worker to be initiated and provides the worker with the processed message data), and jobs associated with the data structures to an event queue 432, which can implement a Python library, or other process, for queueing jobs for background processing.

These structures may be analyzed by cloud workers 433 to perform actions related to the cloud computing events. The data structures may be the same type of data structure, have the same number and type of data fields, may store the same data, and/or may have the same format as each other. In some embodiments, the data structure may include fields for one or more processes which are to be performed, based on the associated cloud computing event.

Generating data structures of the same type based on the event information improves the performance of the information security system 420 by providing a unified view of cloud computing events. The unified view can be generated for different event types which may be received from different cloud computing environments and have different formatting. The unified view of events provided by the data structures of the same type allows the information security system 420 to perform a single security analysis, without requiring separate analyses for different event types or cloud computing environments. This reduces the processing required by information security system 420 and improves the speed at which different cloud computing events may be responded to.

The cloud collectors 431 may pass the collected event information to storage 434. The information security system may store information related to collected cloud computing events and may store information related to cloud computing resources. The stored information may be accessed and analyzed by the information security system 420 in order to determine security risks of cloud computing environment 410, for example by security processing module 436.

The cloud collectors 431 may additionally pass collected event information to an event queue 432. The collected event information passed to the event queue may be include jobs associated with the event information stored within the generated data structures. The event queue 432 may temporarily store information about cloud computing events which are to be analyzed by cloud workers 433, such as jobs to be performed associated with the cloud computing events. The jobs may be ordered on the event queue 432, based on filtering by the cloud collectors 431. The event information including jobs may be ordered based on one or more features of the cloud computing event stored within a data structure associated with a particular job, such as an event type or other event features described herein, or information within the data structure. Specific workers may receive event information such as a job from the event queue 432, based on the ordering and/or features of the cloud computing event information.

Cloud workers 433 may perform one or more operations based on the event information received from event queue 432. For example, the cloud workers 433 may analyze the event information to determine whether one or more actions are to be performed related to the cloud computing events. In some embodiments, the cloud workers 433 analyze information stored in the data structure associated with the event information or job received from the queue. In some embodiments, the data structure indicates one or more actions which are to be performed by the cloud workers 433. In some embodiments, the jobs received from the event queue indicate one or more actions to be performed by cloud workers 433.

In some embodiments, the cloud workers 433 may perform enrichment of the event information. Enrichment of the event information may involve using a harvester 435 of the information security system 420 to request an obtain supplemental information related to the cloud computing event. Enrichment of the event information may involve storing supplemental information within the data structure. The supplemental information may be obtained via an application programming interface call to one or more locations storing data related to the one or more cloud computing events. The one or more locations storing data related to the cloud computing events may be quired by resource API 450. In some embodiments, resource API 450 may be implemented external to the cloud computing environment 410, such as resource API 250 as described with relation to FIG. 2. In some embodiments, the event information may be enriched when additional information is necessary to analyze the security impact of the associated cloud computing event. For example, the event information obtained by cloud collectors 431 may be limited and not include all information relevant to the security of the cloud computing environment 410. The cloud workers 433 may use harvesters 435 to obtain supplemental information which allows for the analysis of the security impact of the associated cloud computing event. In some embodiments, the supplemental information may include additional features of the cloud computing event. For example, the cloud collectors 431 may initially obtain information related to the identity and associated resource of a cloud computing event, and the requested supplemental information may include additional information related to resources associated with the event, such as information related to the impact of the event on the resource. Information related to the impact of the event on the resource may include changes to the metadata of the resource (e.g. changes to the structure of data within the resource, changes to software installed on the resource, changes to permissions for accessing/reading/writing/modifying the resource, or changes to security rules relating to the resource), data changes associated with the event, storage changes associated with the event (e.g., changes to the amount of storage attached to the resource). The supplemental information may include a snapshot of the data within storage attached to the resource. The supplemental information may include any cloud computing event feature not obtained by cloud collectors 431, examples of event features are provided herein.

As shown in FIG. 4, cloud workers, 433A and 433B receive event information such as jobs from the event queue 432. The information security system may include any number of cloud workers 433 and is not limited in this regard. Jobs associated with specific events may be passed to event information workers based on ordering, filtering, and event features. The job passed to cloud worker 433A may be selected because it requires enrichment. Cloud worker 433A may use harvester 435 to request supplemental information from the resource API 450. Cloud worker 433A may then enrich the event information by populating the data structure of the event with supplemental information received from resource API 450. After enrichment, cloud worker 433A may then pass the enriched data to security processing module 436 and storage 434.

Cloud worker 433B may analyze event information not requiring enrichment to determine if any security risks may be present within the cloud computing environment due to the associated event. Cloud worker 433B then passes event information to security management interface 437 and storage 434. In some embodiments, the cloud worker 433B may determine enrichment is necessary based on its analysis, and supplemental information may be requested. In some embodiments, cloud worker 433B may determine additional analysis of the cloud computing event may be needed and therefore the event information is passed to security processing module 436.

Security processing module 436 is provided within information security system 420. Security processing module 436 may perform various analyses on event information and supplemental information in order to determine the presence of information security risks, including information security threats and information security vulnerabilities, present within cloud computing environment 410. Examples of security risks, threats and vulnerabilities are provided herein. Identified security vulnerabilities and threats may be sent to security management interface 437. Efficient identification of vulnerabilities and threats can ensure the cloud computing environment is protected against information security threats.

Security processing module 436 may additionally recommend security actions based on detected security risks. Security actions may include corrective actions to address any identified security risks. Examples of security actions are provided herein. Security processing module 436 may additionally be capable of automatically addressing identified security risks by automatically implementing recommended security actions.

Security processing module 436 may send identified security risks and recommended security actions to security management interface 437. The management interface may allow administrator(s) (not pictured) to view identified security risks and recommended security actions, in addition to information related to cloud computing events and any obtained supplemental data. The security management interface 437 may allow administrators to interact with information security system 420, deploy security actions or deploy other actions to address security concerns within cloud computing environment 410.

Figure 5:
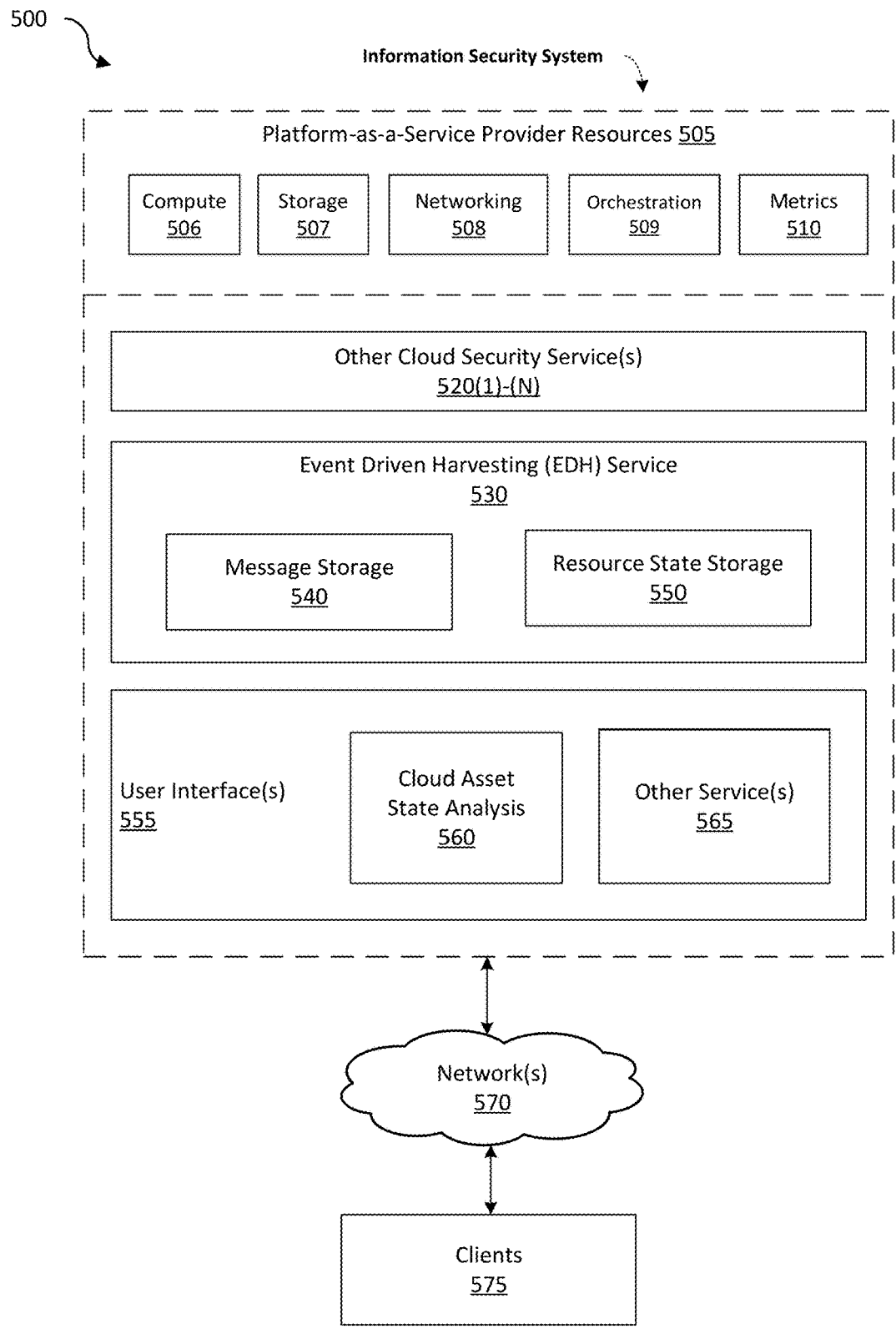
FIG. 5 is a block diagram of an information security system that includes a cloud asset state analysis service that uses cloud computing events and resource states to perform EDH, in cloud security environments, in accordance with some embodiments of the technology described herein.

FIG. 5 is a block diagram of an information security system that includes a cloud asset state analysis service that uses cloud computing events and resource states to perform EDH, in cloud security environments, in accordance with some embodiments of the technology described herein. As shown in FIG. 5, the information security system is implemented using a platform-as-a-service (PaaS) provider network (which may itself be a cloud provider network in some embodiments). The information security system may be operated by a provider company to provide a number of cloud-based client-facing information security systems to various clients. Clients 575 may be operated by different groups, organizations, or other types of entities that are customers of the information security system. In some embodiments, different clients may be associated with different user accounts of the information security system. Client(s) 575 may enable, disable, execute, or otherwise configure (through user interface(s) 555), various cloud security services of the information security system on behalf of different resources hosted in a cloud computing environment (e.g., Cloud computing environment such as cloud computing environment 110A of FIG. 1). For example, cloud resource state analysis 560 may provide real time state analysis for resources of a cloud computing environment, as described in detail above.

Other cloud security service(s) 520(1)-(N) provided by the information security system may include, but are not limited to, visibility and monitoring services to maintain an accurate inventory of different cloud resources, automate and provide real-time remediation security controls and tools, risk assessment and auditing of resources in a cloud provider service, threat detection, resource configuration change monitoring, code security and compliance, among other cloud security services. A cloud provider service may be the same as the PaaS service or a different cloud service provider, and may include different types of computing, storage, networking, orchestration, and metrics resources. For example, computing resources may include different virtual machines that are an instance of an emulated computer or execution environment that is hosted on a physical virtual machine host. The virtual machine host may implement virtualization hardware and/or software (e.g., hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtual machine is the container, which provides a portable and isolated execution environment over a host operating system of a physical host. Example implementations of container technologies include DOCKER, GOOGLE KUBERNETES, AMAZON WEB SERVICES, and MICROSOFT AZURE. Similar techniques may be implemented to host other computing, storage, networking, orchestration, or other resources. For example, instances may be database instances that host a database system or a data storage instance that hosts a virtual disk or other storage device. As described above, access to these computing resources by various entities of the respective cloud computing environments may be allowed or denied according to specified access policies.

In various embodiments, network(s) 570 may encompass any suitable combination of networking hardware and protocols necessary to establish communications between the client(s) 575 and the information security system. In some embodiments, client(s) 575 may execute in a private network of a company, behind a company firewall, and network 570 may include a public network such as the Internet, which lies outside the firewall. Network 570 may encompass the different telecommunications networks and service providers that collectively implement the Internet. In some embodiments, network 570 may also include private networks such as private local area networks (LANs), private wide area networks (WANs), or private wireless networks. Network 570 may be implemented using different hardware (e.g., modems, routers, switches, load balancers, proxy servers, etc.) and software (e.g., protocol stacks, accounting software, firewall/security software, etc.) for establishing networking links between client(s) 575 and the information security system.

As shown in FIG. 5, the information security system implements an EDH service 530. EDH service 530 may perform decoupled event driven harvesting for given cloud entities using the techniques described above. For example, EDH service 530 may, as described with regard to FIGS. 1 and 3, ingest messages to begin processing the collected data about cloud resources and their respective state changes. EDH service 530 may implement message storage 540 in some embodiments. Message storage 540 may store messages for ingestion, which in this example, is the active process of receiving messages from a queue, such as message queue 218 of FIG. 2, by a cloud collector, such as cloud collectors 231 of FIG. 2 or cloud collectors 431 of FIG. 4. EDH service 530 may also implement resource state storage 550 that can permit a comparison between prior and after state changes of a given cloud resource.

As shown, the information security system may also implement a user interface, which provides the user interface 555, as described. The user interface 555 may be a web-based interface that is accessible via a web browser. The user interface 555 may be a graphical or command line user interface. In some embodiments, the user interface 555 may also include real-time notification interfaces such as email or text interfaces. In some embodiments, the user interface 555 may be implemented as part of a user console to allow users to configure various aspects of the information security system, receive assessments reports, and carry out remediation actions. In some embodiments, the user interface 555 will allow users to specify how EDH service 530 operate (or how other cloud security service(s) operate).

As a whole, the information security system may be implemented as a number of web services that receive web services requests formatted as JSON documents. The information security system may support REST-style or document-based (e.g., SOAP-based) types of web services requests. In some embodiments, the information security system may implement service interfaces using other types of remote procedure calling protocols, such as GOOGLE PROTOCOL BUFFERS or PROTOBUF. The PaaS provider network may provide hardware and/or software to implement service endpoints, such that a request directed to that endpoint is properly received and processed.

As shown, the PaaS provider network may provide different types of computing resources 505 for EDH service 530, which can be leased by the operator of the EDH service 530. The PaaS provider may provide resource services such as compute resource service 506, storage resource service 507, networking resources service 508, orchestration service 509, and resource metrics service 510. The services of the information security system may be built using these underlying resource services provided by the PaaS provider. In some embodiments, the Resources 505 of the PaaS provider may implement features such as load balancing of incoming service requests and/or dynamic management and scaling of service node pools. In some embodiments, EDH service 530 and other cloud security service(s) 520(1)-(N) may be implemented using a pool of service nodes provided by the PaaS provider, which may be individual instances of virtual machines. In some embodiments, the PaaS provider may be a provider such as AMAZON WEB SERVICES or MICROSOFT AZURE.

Figure 6:
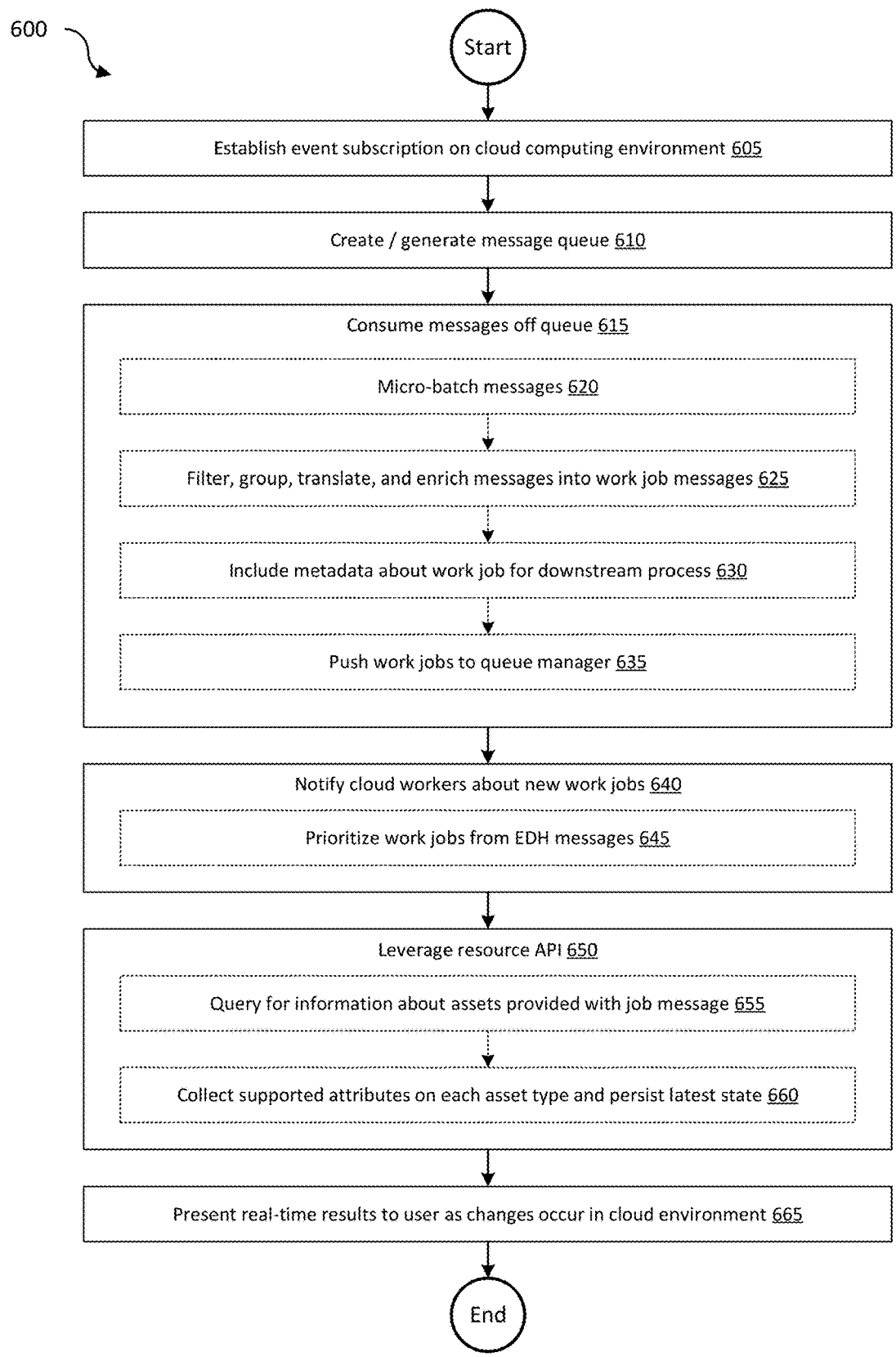
FIG. 6 is a flowchart of an example process 600 for performing EDH in cloud computing environments, in accordance with some embodiments of the technology described herein.

FIG. 6 is a flowchart of an example process 600 for performing EDH in cloud computing environments, in accordance with some embodiments of the technology described herein. The process begins at 605 by establishing an event subscription on a cloud computing environment (or receiving confirmation from a cloud computing environment that an event subscription, account, or other connection has been established to a cloud computing environment). In some examples, 605 may involve establishing an event subscription on a targeted account of a cloud computing environment. At 610, the process creates and/or generates a message queue. In one embodiment, the message queue is a managed message broker on a cloud service that implements message queues that receive data from pre-subscribed services. Messages are sent to and received from queues. Message queues store messages until a receiving application (e.g., a long poll collector) is available to receive and process these messages (e.g., using polling techniques to collect cloud resource related metrics such as created, destroyed, and the like). It should be noted that in this example, the event subscription is configured to only listen to relevant resource changes, as described.

At 615, the process consumes messages off queue. This consumption operation includes at least four sub-steps including: (620) micro-batching messages where the collector groups incoming messages into small groups per cycle, (625) filtering, grouping, translating, and enriching messages into data structures and/or jobs associated with data structures such as work job messages, as described herein, (630) including metadata about actions to be performed by downstream process (e.g., once messages are processed and a data structure is created, the downstream process in this example refers to the part of the application that receives the data structure and determines the correct worker to be initiated and provides the worker (e.g., cloud workers 233 (1)-(N) of FIG. 2 or cloud workers 433 of FIG. 4) with the processed message data), and (635) pushing work jobs associated with the data structures to a queue manager (e.g., queue manager 232 of FIG. 2 or event queue 432 of FIG. 4, which can implement a Python library, or other process, for queueing jobs for background processing).

At 640, the process notifies cloud workers about the new jobs, and at 645, prioritizes work jobs from EDH messages. At 650, the process leverages a resource API (e.g., by querying for information about resources provided with job messages at 635 and collecting supported attributes on each resource type and persisting the (resource's) latest state at 660). The process ends at 665 by presenting real-time (or near real-time) results to a user of the information security system as changes occur in the cloud computing environment.

Figure 7:
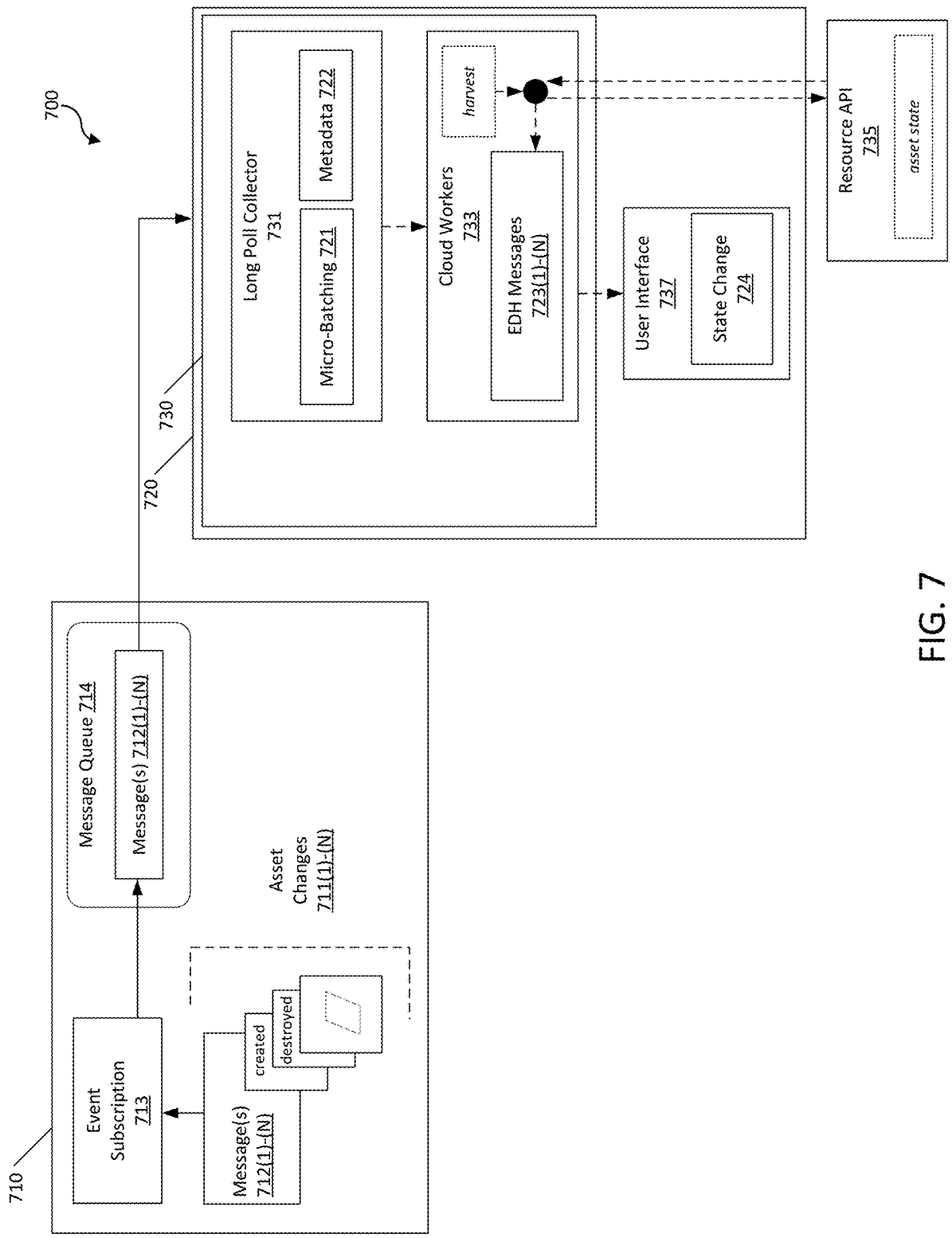
FIG. 7 is a block diagram of an environment 700 with an information security system implemented therein, in accordance with some embodiments of the technology described herein.

FIG. 7 is a block diagram of an environment 700 with an information security system implemented therein, in accordance with some embodiments of the technology described herein. Shown is information security system 720, which includes EDH system 730. EDH system 730 pulls data from a message broker (e.g., Azure Event Grid) into a central queue for use by information security system 720 (e.g., InsightCloudSec provided by Rapid7 ® of Boston, MA). This advantageous approach to data collection in the cloud improves the cadence with which the information security system can provide cloud resource visibility and opportunities for security-based remediation(s). In one embodiment, EDH system 730 enriches the collected data (e.g., from messages) with life-cycle changes (e.g., using Azure Resource Graph, resource APIs and other methods, as described herein) as a method to enable greater auditing capabilities. With EDH-provided data, identifying how a cloud resource entered a noncompliant state is simplified and accelerated, compared to traditional polling methods. Therefore, decoupling collection and ingestion in cloud computing environments is preferable to traditional polling methods.

EDH system 730 allows for near real-time updates on the state of cloud resources within the cloud computing environment 710. In one embodiment, EDH system 730 implements a dedicated collection process that listens for updates via a dedicated message queue. The message queue is configured to receive messages 712(1)-(N) from various event subscriptions. A cloud provider account represents a logical construct of how cloud resources are organized within a given cloud computing environment. The messages pushed onto the message queue capture important or significant state changes on the cloud resources (e.g., removed, updated, added, and the like). A collector (e.g., a long poll collector 731) consumes these messages in batches at a high speed. During processing, the collector executes various actions on the messages including filtering, deduplication, aggregation, and enrichment. Once completed, the processed messages are pushed into another queue provisioned by the information security system (e.g., a Redis queue). As soon as the messages are available on this (second) queue, dedicated harvesters (e.g., cloud workers of the information security system) capture these messages and leverage a resource API to further enrich the data about the cloud resources (e.g., life-cycle changes). Upon completion, the cloud resource is updated into the information security system for users to view, report, and remediate, or may be analyzed by a security analysis module of the information security system, as described herein.

In one embodiment, EDH system 730 receives confirmation of event subscription 713 being established on a cloud computing environment or account of a cloud computing environment (e.g., cloud computing environment 710). In this example, event subscription 713 are a cloud account level construct that permits a central message queue and (eventually) EDH system 730 to receive messages within an account of the cloud computing environment 710. Cloud accounts can be containers that define the scope of cloud resources. Therefore, a cloud account is a mechanism for defining cloud resource boundaries within a cloud computing environment. Once event subscriptions have been created, EDH system 730 creates message queue 714 in the cloud computing environment 710 or targeted account of cloud computing environment 710. It should be noted that each event subscription may be configured to only listen for relevant resource changes (e.g., created, destroyed, and the like). EDH system 730 then configures one or more event subscriptions to send all their messages to message queue 714 within cloud computing environment 710 or on the targeted account of cloud computing environment 710, for handling and processing (e.g., even if those other event subscriptions are associated with other cloud computing environments). Message queue 714 may reside in a targeted account of cloud computing environment 710 but can receive messages from other accounts of cloud computing environment 710.

Next, EDH system 730 configures a process to consume messages 712(1)-(N) off message queue 714. In one embodiment, EDH system 730 implements long poll collector 731 (e.g., an optimized long poll collector such as Golang collector, among others, which consumes messages off message queue 714 and processes each message to be ingested by cloud workers 733)—a process called ingestion. To efficiently process messages 712(1)-(N), long poll collector 731 micro-batches messages (e.g., micro-batching 721). Micro-batching 721 is a procedure by which long poll collector 731 groups incoming messages into small groups per cycle. Micro-batching 721 involves grouping messages 712(1)-(N) within long poll collector 731 while receiving messages 712(1)-(N+X) from message queue 714 to be processed. Instead of retrieving messages one at a time, messages are retrieved in groups (e.g., particularly if a large number of messages are sitting on message queue 714), thus saving processing time, memory, and the need to re-process messages. If duplicate messages are encountered, micro-batching 721 also applies deduplication logic to each batch. For example, long poll collector 731 reads X number of messages in one cycle. Within that batch, long poll collector 731 filters, groups, translates, and enriches the messages into Y number of work job messages of the same type of data structure (referred to and shown as EDH messages 723(1)-(N) in FIG. 4).

In some embodiments, a work job message or an EDH message is a job template (e.g., in JSON format) that contains information including at least (a) a job name to register, (b) the in-queue time, (c) a unique identifier string, and (d) any arguments to pass to the job, and (e) other metadata. The work job messages are examples of data structures which may be generated for cloud computing event information, as described herein. Therefore, each "work job" represents a set of cloud resources grouped by a key and also includes metadata 722 about the work job to assist downstream processes. As noted, once messages are processed and a job template is created, the downstream process refers to the part of the application (e.g., cloud workers 733) that receives the job template and determines the correct harvester to be initiated and provides the harvester with the processed message data. Also as noted, work jobs are pushed onto a second queue as jobs (e.g., queue manager 232 as shown in FIG. 2). It should however be noted that cloud accounts permit definition of where cloud resources reside (e.g., in the form of a or group). For example, cloud computing environment 710 can have multiple cloud accounts within one "tenant" and within each of these cloud accounts can lie the "cloud resources".

In some embodiments, once jobs are pushed onto the second queue, cloud workers 733 are notified of these new jobs being sent in. cloud workers 733 prioritize these jobs since they are "EDH" messages (e.g., EDH messages 723(1)-(N)). Therefore, in this example, cloud workers 733 will prioritize and first process the work jobs identified by EDH messages 723(1)-(N) over normally scheduled jobs. Advantageously, the foregoing ensures that real-time or near real-time results are presented to users (e.g., via user interface 737) as changes (e.g., state change 724) occur in the cloud computing environment.

In other embodiments, when cloud workers 733 handle a given job, cloud workers 733 will identify the job as an "EDH" job and request supplemental information about the event associated with the work job, for example by leveraging a resource API 735. Supplemental information may also be requested from a cloud computing environment as otherwise described herein. In this example, resource API 735 is an API that permits resource exploration within cloud computing environment 710 and thus can be leveraged by EDH system 730 to determine the full state of cloud resources at the time of invocation. For example, a cloud worker 733(1) can use resource API 735 to query for additional information about cloud resources provided with the job message (e.g., EDH message 723(1)). At this point, cloud worker 733(1) establishes and collects attributes supported by the information security system on each cloud resource type and then persists the latest state (of these cloud resources). Cloud workers 733 may populate a data structure for individual cloud computing events with the attributes, as described herein. Once cloud worker 733(1) has completed the cloud resource update, one or more users of the information security system and/or EDH system 730 can visualize state change 724 in user interface 737. In one embodiment, user interface 737 of information security system also permits the receiving of notification(s) and the running of automation(s) on events.

Gaining insight into a cloud deployment is a technology-related challenge. Capturing changes to cloud resources in real-time depends on polling on a consistent basis (e.g., against various APIs). This method presents limitations when trying to gain real-time updates for users in disparate platforms (e.g., cloud security systems). For instance, rate limits can restrict how often cloud computing environments can be queried, which in turn significantly delays updates. Advantageously, EDH system 730 gets around rate limitations and data presentation latency because updates are pushed rather than pulled and derived, thus permitting a real-time view of a customer's cloud posture.

Figure 8A:
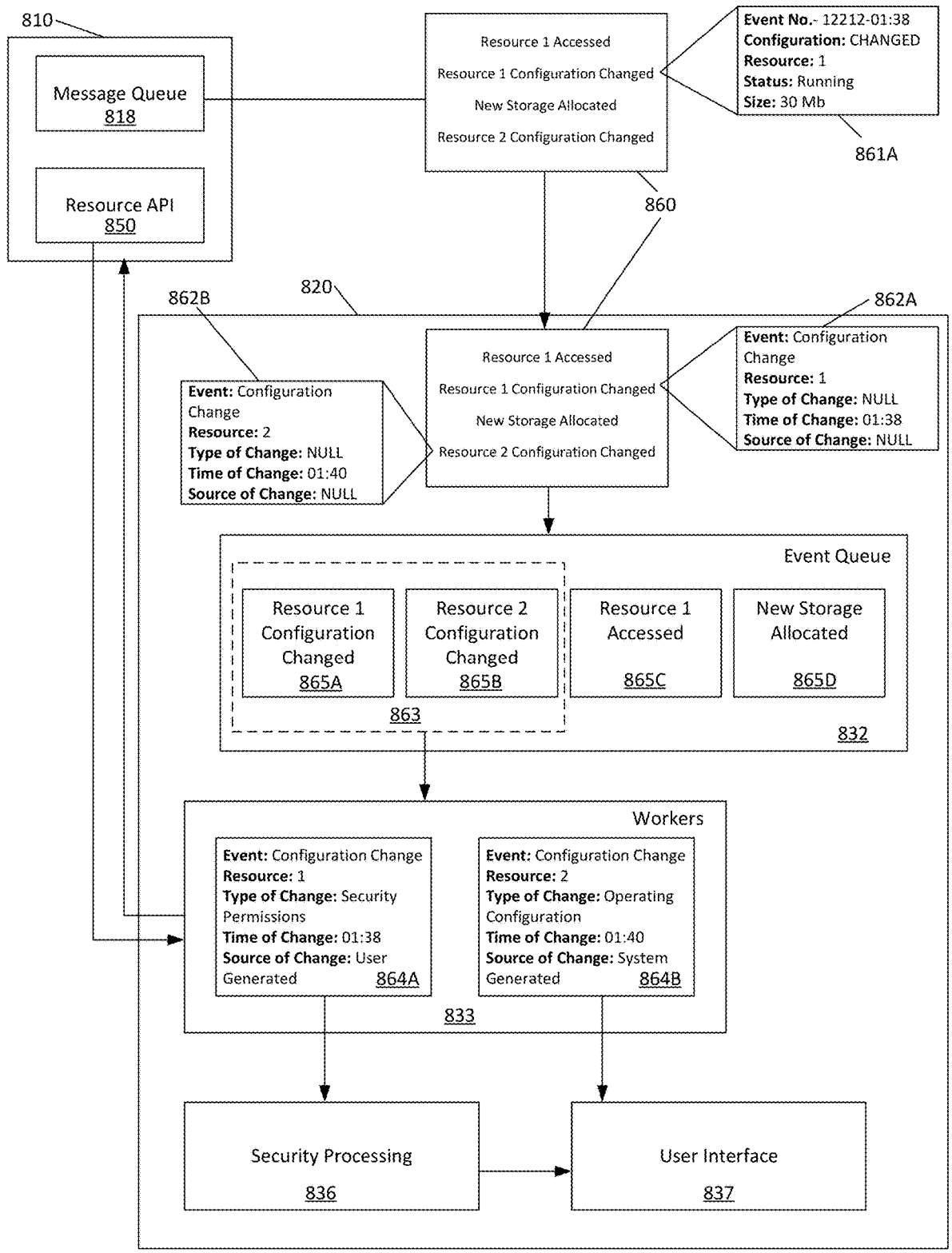
FIG. 8A illustrates an example EDH process, in accordance with some embodiments of the technology described herein.

FIG. 8A illustrates an example EDH process, in accordance with some embodiments of the technology described herein. As shown, event information 860 about a group of cloud computing events is collected from a message queue 818 of a cloud computing environment 810. The event information may be collected as described herein. The event information may include one or more features related to the cloud computing events. Features 861A related to the "Resource 1 Configuration Changed" event are shown. The features 861A include an event number feature, an event configuration feature, an associated resource feature, an event status feature, and a size feature. Events included in the event information 860 may include the same features as features 861A or may include a different number or type of features.

The event information 860 is collected by an information security system 820, as described herein. The information may be collected by an EDH system of the information security system 820. Upon collection, the event information 860 may undergo one or more processes. For example, the event information may be used to populate a data structure for each cloud computing event included in event information 860. Data structure 862A is shown, with features 861A populated within the fields of the data structure. The data structure contains an event feature field, a resource field, a type of change field, a time of change field, and a source of change field. As shown, the data structure 862A includes some fields which align with features which were collected with event information 860 and some fields which were not collected with event information 860. In addition, the data structure 862A does not include all features collected with event information 860. In some embodiments, the data structure may include a greater number of fields than the features collected with event information, the same fields as those collected with event information or fewer fields than those collected with event information 860. As shown, data structure 862A has a NULL value for the type of change field and for the source of change field, as these features were not included in the event information 860 collected from cloud computing environment 810. Data structure 862B, related to the "Resource 2 Configuration Changed" event also has a NULL value for the type of change feature and the source of change feature.

After collection and processing, jobs 865A-D associated with the event information, now stored within a data structure may be pushed to an event queue 832 of the information security system 820. The event queue 832 may maintain jobs associated with each data structure which are to be performed by the information security system. As shown, jobs 865A and 865B associated with the event information associated with data structures 862A and 862B, respectively, on the event queue are separated into group 863. During collection, the collector may have filtered these events from the other cloud computing events based on the event type. Specific cloud computing events may indicate a greater security risk and are therefore fileted out and prioritized for analysis on event queue 832.

Jobs from group 863 are received by workers 833 for analysis before other jobs on event queue 832 because they was prioritized for analysis. Workers 833 may determine based on the information contained within jobs 865 and/or within data structures 862 one or more actions to perform, as described herein. As shown, the workers may enrich the data within the data structures by requesting supplemental data related to the event, as described herein. As shown, the "Resource 1 Configuration Changed" and "Resource 2 Configuration Changed" events are both enriched with supplemental data. The workers 833 may determine that both events require enrichment because they have NULL values for the type of change feature and source of change feature of the data structures 862A and 862B. The workers 833 may request this data, for example from resource API 850 of the cloud computing environment 810. In some embodiments, the workers may request data from a service of the cloud computing environment, as described herein.

As shown the supplemental information indicates the "Resource 1 Configuration Change" event was a security permissions change and was user generated, and the "Resource 2 Configuration Change" event was an operating configuration change and was system generated. Workers may then analyze the enriched data structures 864A and 864B to determine whether security analysis is necessary. The workers 833 may determine that because the event associated with data structure 864A was user generated and related to security permissions security, an analysis is necessary and therefore the data structure 864A is sent to security processing module 836. The workers 833 may also determine that security processing is not needed for the event information stored within data structure 864B because the source of the change was system generated and it is related to operating configurations. Therefore, data structure 864B and is instead sent to user interface 837.

Security processing module 836 may analyze event information stored within data structure 864A as described herein. Security processing module 836 may determine one or more security risks associated with event information from data structure 864A and may determine one or more security actions based on the security risks. The security actions and risks may be passed to user interface 837 along with the event information stored in data structure 864A.

Figure 8B:
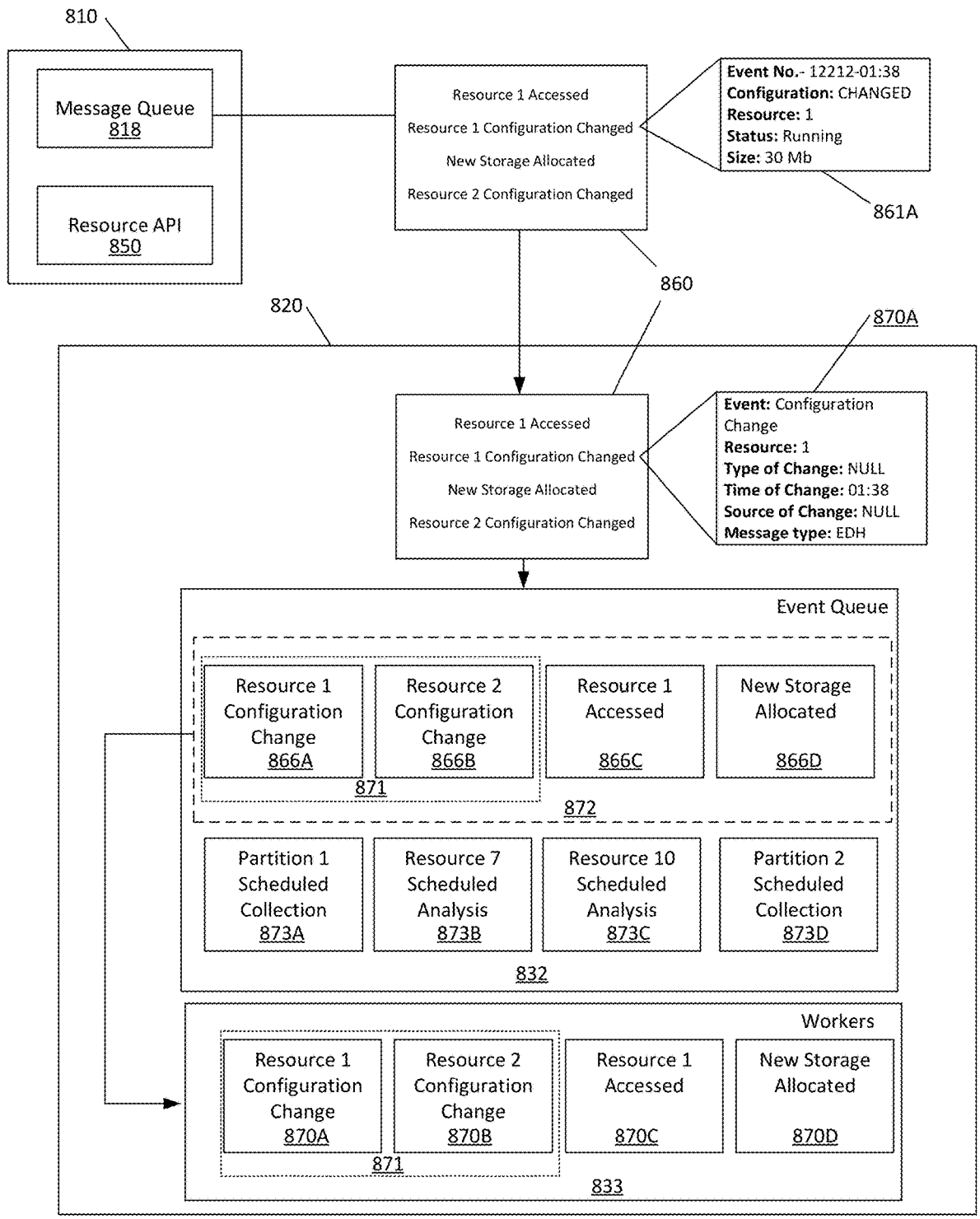
FIG. 8B illustrates an example EDH process and filtering and prioritization, in accordance with some embodiments of the technology described herein.

FIG. 8B illustrates an example EDH process and filtering and prioritization, in accordance with some embodiments of the technology described herein. As shown, event information 860 about the same group of events is provided from message queue 818 of cloud computing environment 810. The event information 860 may be collected by collectors of the information security system 820 as described herein. The collection process may include storing information related to event features within a data structure such as data structure 870A. Data structure 870A contains information related to the "Resource 1 Configuration Change" event. Data structure 870A additionally includes a message type field which indicates that the associated event is an EDH event and therefore may be treated differently from other data structures within information security system 820.

Jobs 866A-D associated with the event information, now stored within data structures, is then pushed to event queue 832. The event queue 832 may maintain jobs associated with each data structure which are to be performed by the information security system. The event information may be filtered and prioritized during collection, as described herein. On event queue 832, jobs 866A and 866D associated with data structures 870A and 870B, respectively, are separated into group 871, based on the event type, as described with relation to FIG. 8A. Event queue 832 additionally may prioritize jobs, such as work jobs based on the type of event associated with the job. As shown the event queue contains jobs related to the cloud computing events collected by the information security system 820 including a job 866A associated with data structure 870A related to Resource 1 Configuration Change, a job 866B associated with data structure 870B related to Resource 2 Configuration Change, a job 866C associated with data structure 870C related to Resource 1 Accessed, and a job associated 866D with data structure 870D related to New Storage allocated. The event queue also includes jobs related to scheduled processes which are to occur within information security system 820. These jobs related to scheduled processes include Partition 1 Scheduled Collection 873A, Resource 7 Scheduled Analysis 873B, Resource 10 Scheduled Analysis 873C, and Partition 2 Scheduled Collection 873D. The event queue may determine jobs 866A-D associated with data structures 870A-D should be separated from jobs 873 associated with scheduled processes, as the jobs 866A-D associated with data structures 870A-D are related to EDH processes and therefore may be in response to a security impacting event which has occurred within cloud computing environment 810. Prioritization of jobs relating to EDH processes ensures that information security system 820 may respond in real time or near real time to security risks and threats present within cloud computing environment 810.

As shown the EDH jobs within group 872 are passed to workers 833, with group 871 within the group 872 prioritized for initial analysis. Workers 833 may analyze and perform one or more actions on the event information associated with each job as described herein.

Figure 8C:
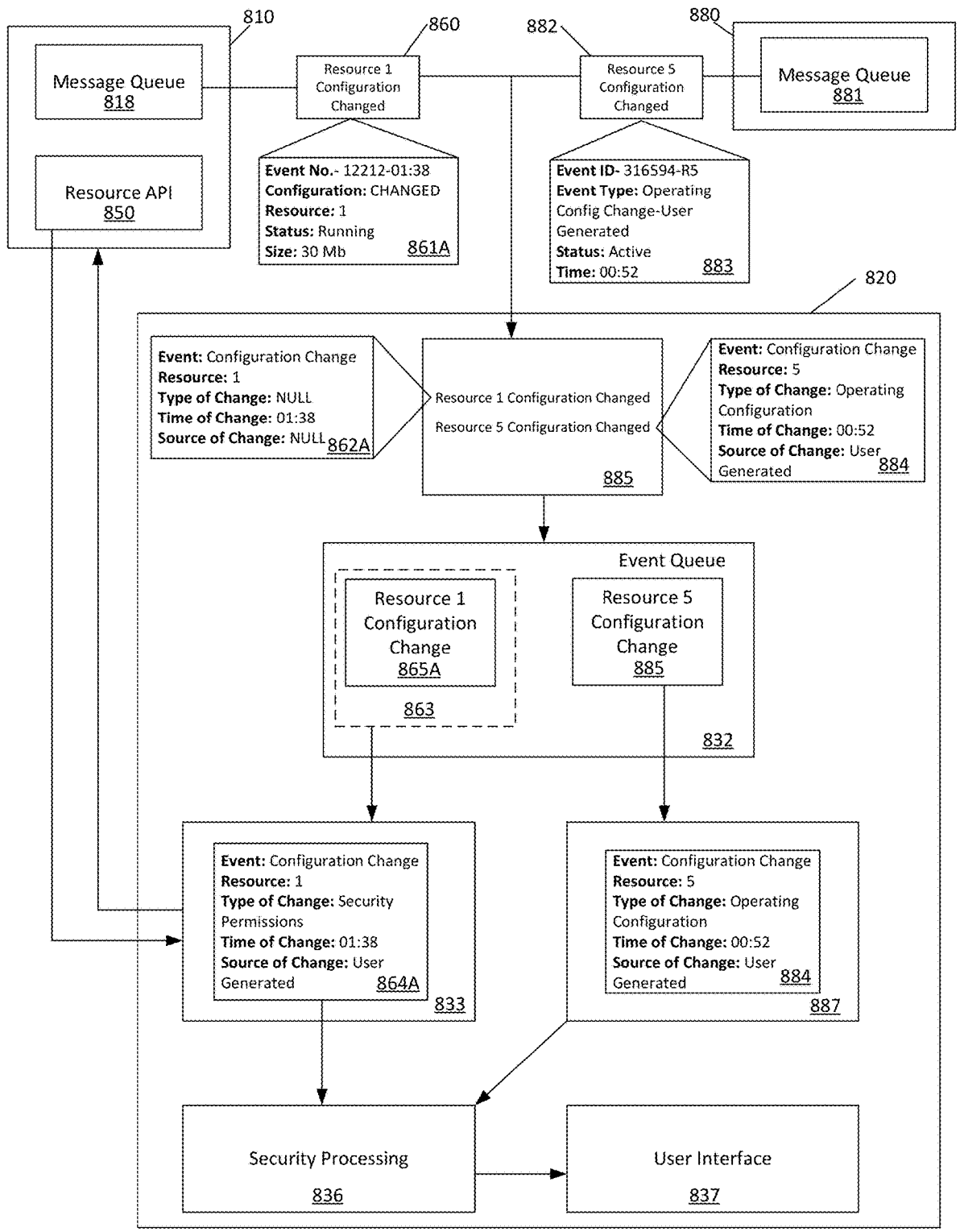
FIG. 8C provides an illustrative example of an information security system which receives event information from two cloud computing environments, in accordance with some embodiments of the technology described herein.

FIG. 8C provides an illustrative example of an information security system which receives event information from two cloud computing environments, in accordance with some embodiments of the technology described herein. As shown information security system 820 collects cloud computing event information from cloud computing environment 810 and cloud computing environment 880. Cloud computing environments 810 and 880 may be different cloud computing environments, for example a GCP cloud and an AWS cloud. Information security system 820 collects event information 860 from message queue 818 of cloud computing environment 810, and cloud computing event information 882 from message queue 881 of cloud computing environment 880.

As shown event information 860 includes features 861A, including an event number feature, an event configuration feature, a resource feature, a status feature, and a size feature. Cloud computing event information 882 includes features 883 which include an event identification feature, An event type feature, an event status feature, and an event time feature. The two cloud computing environments, 810 and 880, provide different types of features and a different number of features. This results in the cloud computing event information 882 received from cloud computing environment 880 filling all fields of the data structure 884 while event information 860 does not fill all fields of data structure 862A during collection. Collectors may then determine that data structure 862A requires enrichment and creates group 863 to indicate this.

Jobs 865A and 885 associated with the data structures 862A and 884 respectively, may then be sent to event queue 832. Workers 833 and 887 may the pull the data structures associated with the jobs received from event queue 823 for analysis. Specific workers may analyze data structures depending on the analysis to be performed as indicated by the associated job. For example, data structures within group 863 may be analyzed by specific workers because enrichment is required, therefore data structure 862A is analyzed and enriched by worker 833. Worker 887 may analyze data structures not requiring enrichment and therefore analyzes data structure 884.

Generating data structures of the same type for the event information and supplemental information obtained from cloud computing environments allows information security system 820 to analyze a unified view of cloud computing events from multiple sources. Therefore, the same analysis may be performed across different cloud computing environments (e.g., AWS, GCP, and Azure) which provide varying levels of information about cloud computing events. Additionally, the data structures of the same type allow for the same analysis of cloud computing events which provide varying levels of information on features of the events. Performing the same security analysis across different cloud computing environments and events simplifies the processing performed by an information security system and allows an information security system to identify security risks faster and across a wide range of environments.

Workers 887 and 833 may determine because both events are user generated, they require further analysis by security processing module 836. Security processing module 836 may analyze the event information as described herein and may provide one or more security risks and/or actions to user interface 837.

Figure 9:
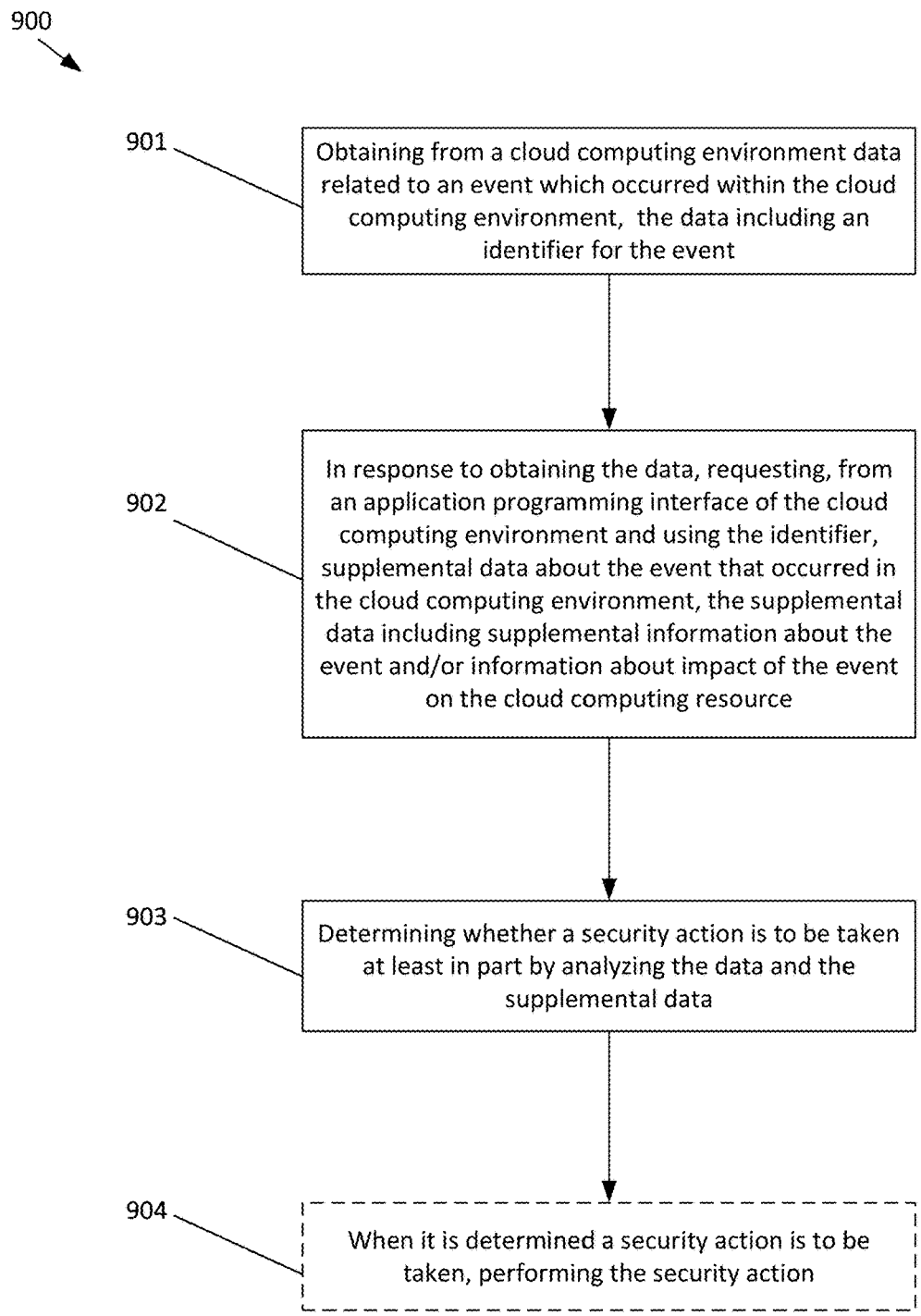
FIG. 9 is a flowchart of an example process 900, which may be performed by an information security system to obtain and analyze cloud computing event information, in accordance with some embodiments of the technology described herein.

FIG. 9 is a flowchart of an example process 900, which may be performed by an information security system to obtain and analyze cloud computing event information, in accordance with some embodiments of the technology described herein.

Process 900 begins at step 901, in which data is obtained from a cloud computing environment, related to an event which occurred within the cloud computing environment. The data may include an identifier for the event. Step 901 may be performed by a collector of an information security system, such as cloud collectors 231 of FIG. 2 or cloud collectors 431 of FIG. 4. The data may be obtained from a log of the cloud computing environment and/or via a message queue of the cloud computing environment via one or more event subscriptions within the accounts of the cloud computing environment. In some embodiments, the information security system may perform one or more actions on the data as it is obtained from the cloud computing environment, including micro-batching data where the collector groups incoming messages into small groups per cycle; filtering, grouping, translating, and enriching messages into data structures and/or jobs associated with data structures such as work jobs or work job messages, as described herein; including metadata about actions to be performed by downstream process in the data structures (e.g., once messages are processed and a data structure is created, the downstream process in this example refers to the part of the application that receives the data structure and determines the correct worker to be initiated and provides the worker with the processed message data), and pushing jobs associated with the data structures to a queue (e.g., queue manager 232 of FIG. 2 or event queue 432 of FIG. 4, as described herein.

Process 900 then proceeds to step 902 which is performed in response to obtaining the data in step 901. In step 902, supplemental data including supplemental information about the event and or information about the impact of the event on a cloud computing resource is requested from an application programming interface of the cloud computing environment, using the identifier. The supplemental data may be collected as a part of enrichment of event information, as described herein. The step 902 may be performed by a harvester of an information security system, as described herein, such as harvester 435 of FIG. 4 or by workers of the cloud computing environment, such as cloud workers 233 (1)-(N) of FIG. 2. The supplemental data may be maintained in storage of the cloud computing environment or may be made available via a service such as a resource API, as described herein.

Process 900 then proceeds to step 903 in which it is determined whether a security action is to be taken at least in part by analyzing the data and the supplemental data. This may involve analyzing the data using a security processing module, such as security processing module 436 of FIG. 4. The analyzing may involve determining one or more security risks present within the cloud computing environment. Examples of security risks are provided herein. It may be determined that a security action should be taken if one or more security risks are identified. Examples of security actions are provided herein.

The process 900 may then proceed to step 904 in which, if it is determined a security action is to be taken, the security action is performed. The security action may be automatically performed by the information security system, as described herein. In some embodiments, step 904 may not be performed, and the information security system may instead display the determined security actions on a user interface of the information security system for an administrator of the system to analyze, as described herein.

Figure 10A:
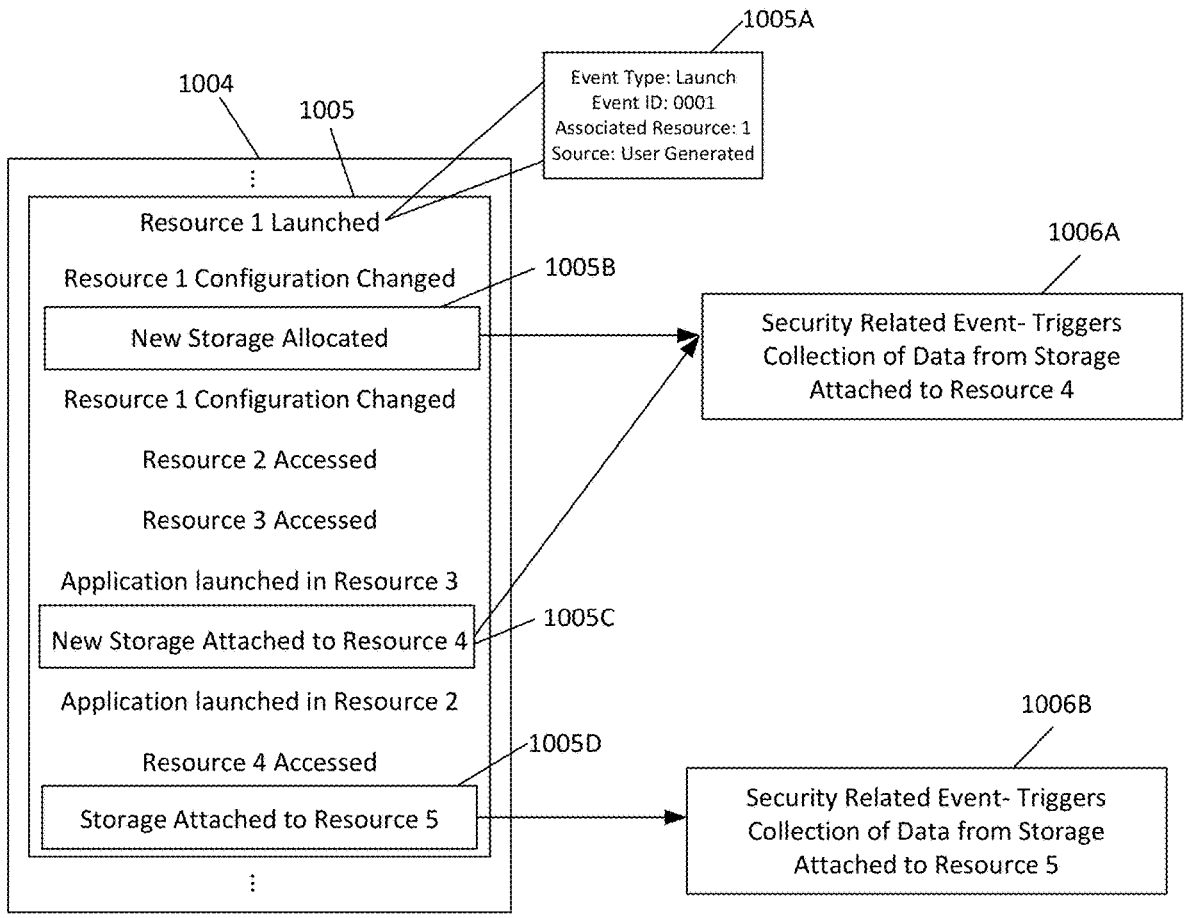
FIG. 10A is an illustration of a cloud computing log and information about cloud computing events contained within log, in accordance with some embodiments of the technology described herein.

Now, an example of event driven harvesting based on event types will be described. FIG. 10A is an illustration of a cloud computing log and information about cloud computing events contained within log, in accordance with some embodiments of the technology described herein. Example event types and resources, when applicable, are listed for each event of event information 1005.

The event information 1005 contained within log 1004 includes one or more features of each event which has occurred within the associated cloud computing environment, such as cloud computing environments 110A-C of FIG. 1. The event information 1005 about events stored within log 1004 may include features such as: an event type, a time the event occurred, a unique identifier associated with the event, a source of the event, and a virtual cloud computing resource associated with the event, an amount of storage attached to a resource, an amount of storage allocated, and/or changes to a resource, among other information. The events may each have a different number of features within log 1004. Example event types are provided herein. Specific cloud computing environments 1000 such as AWS Cloud, Google Could, Azure, Oracle and IBM cloud may each have specific sets of event types associated with cloud events. The source of an event may be software within a particular resource, user action within a particular resource, and cloud software among other sources.

Event information 1005A shows additional features about a particular event, the event type is "Launched", the unique event identifier is 0001, the cloud computing resource associated with the event is resource 1, and the source of the event is user generated.

Event information 1005 about cloud computing events contained within log 1004 may be analyzed by an information security system, such as information security system 120 of FIG. 1, to determine cloud computing resources which require analysis, or supplemental data to be collected. The information security system may analyze one or more features of the event information 1005 within log 1004 to identify events which should have data about associated resources collected. For example, an information security system as described herein may analyze the event type associated with a cloud computing event to determine if the event is related to the allocation of new storage to a resource, the allocation of new storage to a cloud computing environment and/or the attachment of storage to a resource. Event types which indicated new storage is being allocated to the cloud computing environment and events types which indicate new storage is being allocated or attached to a resource may indicate the associated cloud computing resource should be examined. These events may indicate the presence of one or more security risks or vulnerabilities within an associated cloud computing resource, as the new storage attached to a particular resource may be used to run malicious software or may indicate malicious activity occurring within the resource. Therefore, it is important to analyze an associated resource immediately following the identification of one or more of these events within log 1004.

In some embodiments, the information security system may analyze one or more features of event information 1005, in addition to, or in place of the type associated with the cloud computing event, to determine cloud computing resources which require supplemental data to be harvested. For example, information security system may analyze information related to a source of the event, and a virtual cloud computing resource associated with the event, an amount of storage attached to a resource, an amount of storage allocated, and/or changes to a resource, among other features described herein.

The information security system may analyze the event information 1005 contained within the log 1004 for information about events occurring in a specific sequence, for example an event related to allocating new storage to the cloud computing environment, followed by an event related to attaching storage to a cloud computing resource. Event information 1005 may be collected from the cloud computing environment as described herein, for example by cloud collectors 231 of FIG. 2 or cloud collectors 431 of FIG. 4. Information associated with these events need not be sequentially listed one after the other within log 1004 to be identified by the information security system and may instead have information about one or more events between them. The information security system may additionally or alternatively search for information about individual events associated with attaching storage to a particular cloud computing resource. Examples of both types of identification are shown in FIG. 10A, with information about events determined, by the information security system, to be related to the allocation of storage to the cloud computing environment and/or the attachment of storage to a cloud computing resource shown in boxes.

When searching for information about a pair of events related to new storage allocation to the cloud computing environment and attachment of storage to a resource, the information security system will first search the event information 1005 contained within log 1004 for information about an event related to allocating new storage to the cloud computing environment such as event information 1005B. After identifying event information 1005B as being about an event related to allocating new storage to the cloud computing environment, the information security system will then search for information within log 1004 about an event related to attaching storage to a cloud computing resource, such as event information 1005C. Event information 1005C indicates new storage has been attached to Resource 4. The pairing of information about these two events may indicate additional processes are running within Resource 4 and/or malicious activity is occurring within Resource 4, therefore action should be taken to analyze resource 4. In FIG. 10A, the information security system does not identify the information about the four events listed between 1005B and 1005C as being related to the allocation of storage to the cloud computing environment or the attachment of storage to a cloud computing resource and therefore these no action may be performed related to these events.

Also shown in FIG. 10A is a situation where the information security system may search for information about single events related to the attachment of storage to a cloud computing resource. In FIG. 10A, event 1005D is identified by the information security system, as event 1005D relates to attaching storage to Resource 5 and indicates resource 5 should be analyzed.

In response to identifying information about events related to the allocation of storage to the cloud computing environment and/or the attachment of storage to a cloud computing resource, information security system may undertake certain actions. For example, the information security system may trigger an event driven harvesting process, in which supplemental data related to the events are harvested for enrichment of the information already obtained about the events. The event driven harvesting process may include collection of data from storage attached to a cloud resource associated with the events. In FIG. 10A, in response to event information 1005B and 1005C, the collection of data from storage attached to Resource 4 is triggered, shown as 1006A, and in response to event 1005D, the collection of data from storage attached to Resource 5 is triggered, shown as 1006B. Collection of data from storage attached to a particular resource allows for the analysis of data contained within the storage and for the identification and correction of security risks and threats which may be contained within the resource.

In some embodiments, one or more processes may be executed before triggering the collection of data from storage allocated to a particular resource, in response to an event within log 1004. For example, in response to an event within log 1004, one or more API calls may be made to query the cloud provider to retrieve additional details related to the particular event. Such additional details may include event features as described herein. In some examples, the information received from a cloud computing log may not include sufficient information to determine if an event is related to the allocation of storage to the cloud computing environment and/or the attachment of storage to a cloud computing resource, and therefore supplemental information related to the event must be requested from the cloud computing environment, for example through API calls to a resource API, as described herein. The information security system may then collect data from storage attached to a resource, in response to determining from the received supplemental information that the event associated with the resource is related to the allocation of storage to the cloud computing environment and/or the attachment of storage to a cloud computing resource.

In some embodiments, the information security system may analyze the event information 1005 without performing enrichment on the event information or requesting supplemental data. In such examples, the information received from the logs of the cloud computing environment contain sufficient information to determine whether an event is related to the allocation of storage to the cloud computing environment and/or the attachment of storage to a cloud computing resource. In some embodiments, the collection of data associated with a resource may occur during the enrichment of event data, as described herein. In some embodiments, the information security may first enrich event information, such as event information 1005, as described herein, and may collect data associated with a resource in response to analyzing the enriched event information.

Figure 10B:
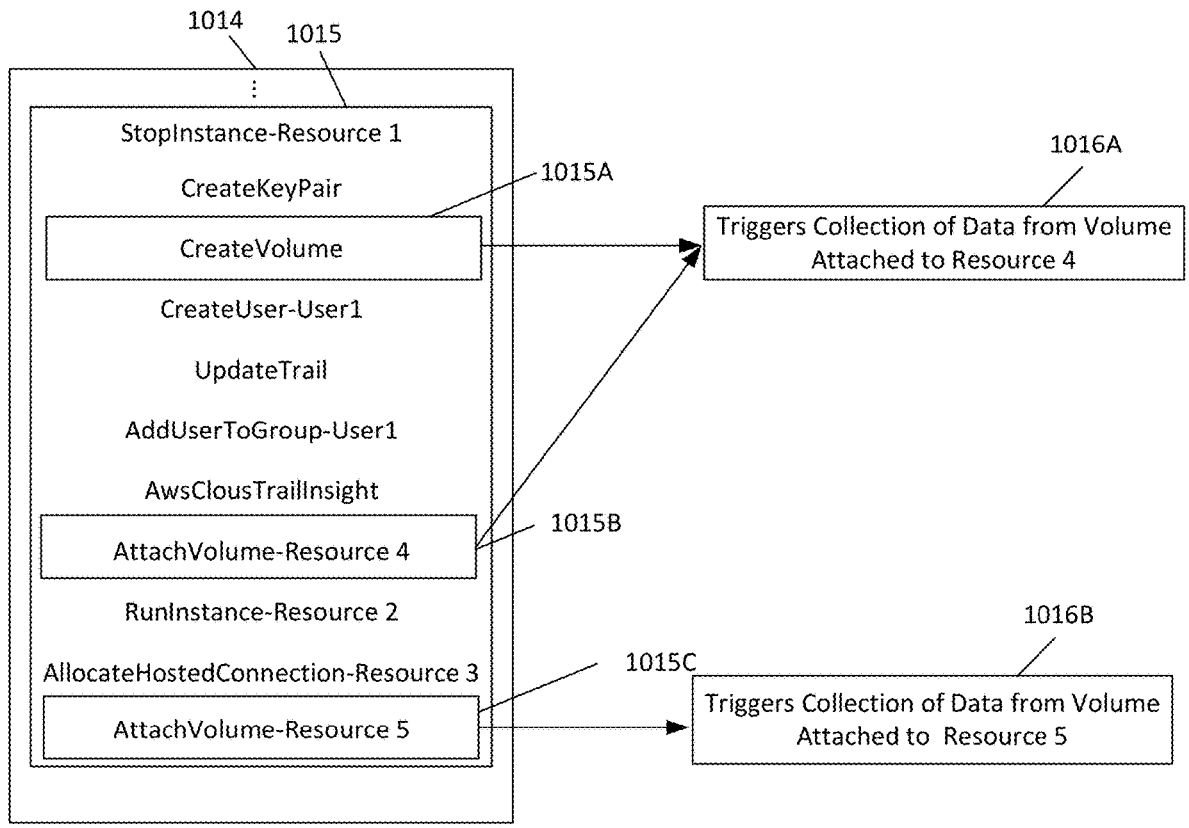
FIG. 10B illustrates an example of a cloud computing log and information about events within the log, when the log is an Amazon Web Services (AWS) "CloudTrail" log and the cloud computing environment is an AWS cloud computing environment, in accordance with some embodiments of the technology described herein.

FIG. 10B illustrates an example of a cloud computing log and information about events within the log, when the log is an Amazon Web Services (AWS) "CloudTrail" log and the cloud computing environment is an AWS cloud computing environment, in accordance with some embodiments of the technology described herein. AWS "CloudTrail" log 1014 is a feature within the AWS cloud computing environment, which holds information related to events which have occurred within the AWS cloud computing environment. Event information recorded to "CloudTrail" log 1014 has specific event types associated with the AWS cloud computing environment API, and different events may have different numbers of features contained within "CloudTrail"

log 1014. As shown in FIG. 10B, "CloudTrail" log 1014, contains AWS specific event information 1015, with event types and cloud computing resources, where applicable, shown. In some embodiments, the information security system may perform one or more actions on the event information 1015 within the "CloudTrail" log 1014. For example, the event information may be used to generate respective data structures for each of the events, as described herein.

In an AWS "CloudTrail" log, an information security system, such as information security system 120 of FIG. 1, may search for information about AWS-specific events which are associated with the allocation of storage to the cloud computing environment and the attachment of storage to a cloud computing resource. The information security system may obtain event information, including "CloudTrail" log 1014 as described herein, such as by a collector of the information security system (e.g., cloud collectors 231 of FIG. 2 or cloud collectors 431 of FIG. 4). In the AWS "CloudTrail" log, the event type associated with the allocation of storage to the cloud computing environment "Create Volume", and the event type for the attachment of storage to a particular cloud computing resource is "Attach Volume". FIG. 10B mirrors the event types for FIG. 10A which trigger the collection of data from Resource 4, and which trigger the collection of data from Resource 5. In FIG. 10B, the information security system may search for information about a pair of events which trigger the collection of a data from resource. In FIG. 10B, the first event may be a "Create Volume" event, which indicates new storage has been allocated to the cloud computing environment and the second event may be an "Attach Volume" event, indicating that storage has been attached to a particular cloud computing resource.

In FIG. 10B, event information 1015A and 1015B is identified by the information security system and this information about the pair of events triggers the collection of data from Resource 4 for analysis, as shown by 1016A. The information security system may additionally or alternatively search for information about a single "Attach Volume" event within "CloudTrail" log 1014 indicating storage has been attached to a particular cloud computing resource, as shown by event information 1015C, which triggers collection of data from volume attached to Resource 1016B. A worker of the information security system may determine the collection of data from volume attached to Resource 5 is needed, and the collection may be performed by a harvester of the information security system, such as harvesters 435 of FIG. 4. The collection of data from volume attached to resources may be performed as a part of enrichment of event information as described herein.

In some embodiments, one or more processes may be executed before triggering the collection of data from storage allocated to a particular resource, in response to event information 1015 within "CloudTrail" log 1014. For example, in response to event information 1015 within "CloudTrail" log 1014, one or more API calls may be made to query the cloud provider to retrieve additional details related to the particular event. Such additional details may include event features as described herein.

In some embodiments, the information security system may analyze the event information 1015 without performing enrichment on the event information. In some embodiments, the collection of data associated with a resource may occur during the enrichment of event data, as described herein. In some embodiments, the information security system may first enrich event information, such as event information 1015, as described herein, and may collect data associated with a resource in response to analyzing the enriched event information.

Such analysis of information within cloud computing log(s) may be carried out within any cloud computing environment including Google Could, Azure, Oracle and IBM cloud, and each environment may have specific event features which are identified by an information security system. Example event types for various cloud computing environments are provided herein.

Figure 11:
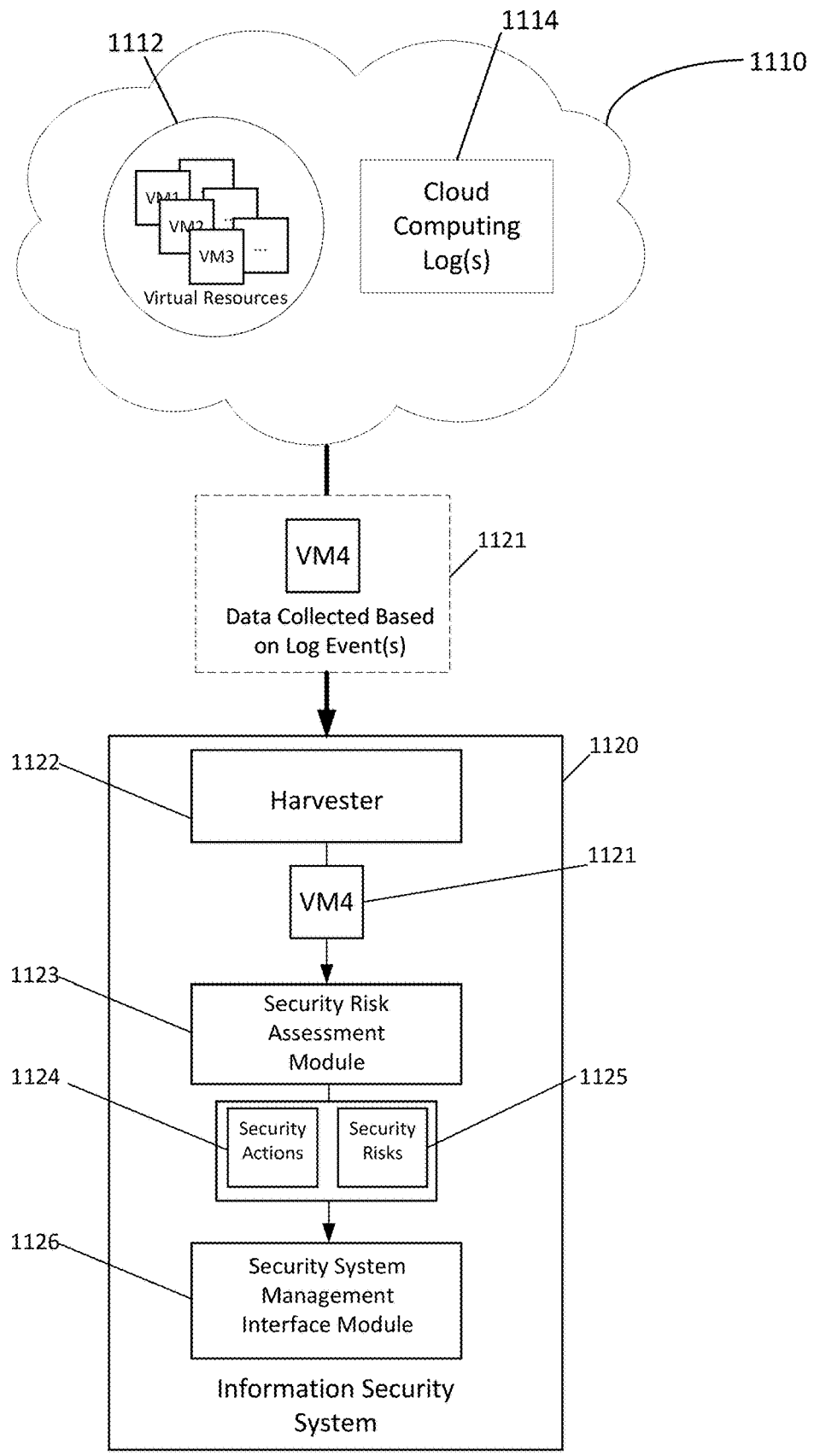
FIG. 11 is an illustration of collecting data from a cloud computing resource to be analyzed by information security system, in accordance with some embodiments of the technology described herein.

FIG. 11 is an illustration of collecting data from a cloud computing resource to be analyzed by information security system, in accordance with some embodiments of the technology described herein. As described above, certain resources may require analysis based upon information 1115 associated with events related to these resources from one or more cloud computing log(s) 1114 or may require supplemental data be collected as a part of event enrichment, as described herein. In the example of FIG. 11, data from cloud computing Resource 4 is to be collected and analyzed by information security system 1120. To collect data from a resource, a harvester 1122 of information security system 1120 may communicate the particular resource to be collected, in this example Resource 4, to the cloud computing environment 1110. This may be accomplished in any suitable way and, for example, may be done via application programming interface (API) calls to the cloud computing software.

The process of collecting data relating to a particular cloud computing resource, in response to information security system 1120 determining one or more cloud computing events is associated with allocation of storage for the cloud computing resource or requires further information, should be initiated within a threshold amount of time of determining one or more cloud computing events is associated with allocation of storage of for the cloud computing resource. The threshold amount of time may be 10 minutes, 5 minutes, 4 minutes, 3 minutes, 2 minutes, 1 minute, 45 seconds, 30 seconds, and 15 seconds.

The supplemental data 1121 from Resource 4 may be generated within cloud computing environment 1110 by taking a full or partial snapshot of the data contained within Resource 4. In some embodiments, a full snapshot of all data from Resource 4 may be taken and provided to information security system 1120. In other examples, a partial snapshot of only the root instance of Resource 4 may be taken and provided to information security system 1120, in these examples the root instance will provide information on all processes running within Resource 4. In other examples, a partial snapshot of only the newly attached storage may be taken and provided to information security system 1120. In other examples, a partial snapshot of a subset of the data from Resource 4 may be taken and provided to information security system 1120. The supplemental data 1121 provided to information security system may be received at harvester 1122.

Harvester 1122 is provided in information security system 1120. Harvester is in communication with cloud computing environment 1110 and may request and receive supplemental data 1121 from cloud computing environment 1110. Harvester 1122 may communicate with cloud computing environment 1110 to request certain resources for collection, for example data from a resource may be collected if events with types indicating new storage is allocated to the cloud computing environment and/or new storage is being attached to the resource are identified in log(s) 1114.

Harvester 1122 may distribute collected data to other modules within information security system 1120. Harvester 1122 may distribute collected supplemental data 1121 to security risk assessment module 1123, where supplemental data may be analyzed for security threats and vulnerabilities, or to workers, such as cloud workers 233(1)-(N) of FIG. 2, as described herein. Collected supplemental data 1121 may be stored within a data structure, as described herein.

Security risk assessment module 1123 is provided within information security system 1120. Security risk assessment module 1123 may perform various analyses on collected supplemental data 1121 to determine the presence of security risks, including security threats and security vulnerabilities, present within the respective resource, in this example Resource 4. Examples of security risks, threats and vulnerabilities are provided herein. Identified security vulnerabilities and threats may be sent to security system management interface module 1126 as security risks 1125. Efficient identification of vulnerabilities and threats can ensure the cloud computing environment is protected against information security threats.

Security risk assessment module 1123 may additionally recommend security actions 1124 based on identified security risks 1125. Security actions 1124 may include corrective actions to address any identified security risks 1125. Examples of security actions 1124 are provided herein. Security risk assessment module 1123 may additionally be capable of automatically addressing identified security risks by automatically implementing recommended security actions 1124.

Security risk assessment module 1123 may send identified security risks 1125 and recommended security actions 1124 to security system management interface module 1126. Security system management interface module may allow administrator(s) (not pictured) to view identified security risks 1125 and recommended security actions 1124. Security system management interface module 1126 may allow administrators to interact with information security system 1120, deploy security actions 1124 or deploy other actions to address security concerns within the respective resource, in this example Resource 4.

Figure 12:
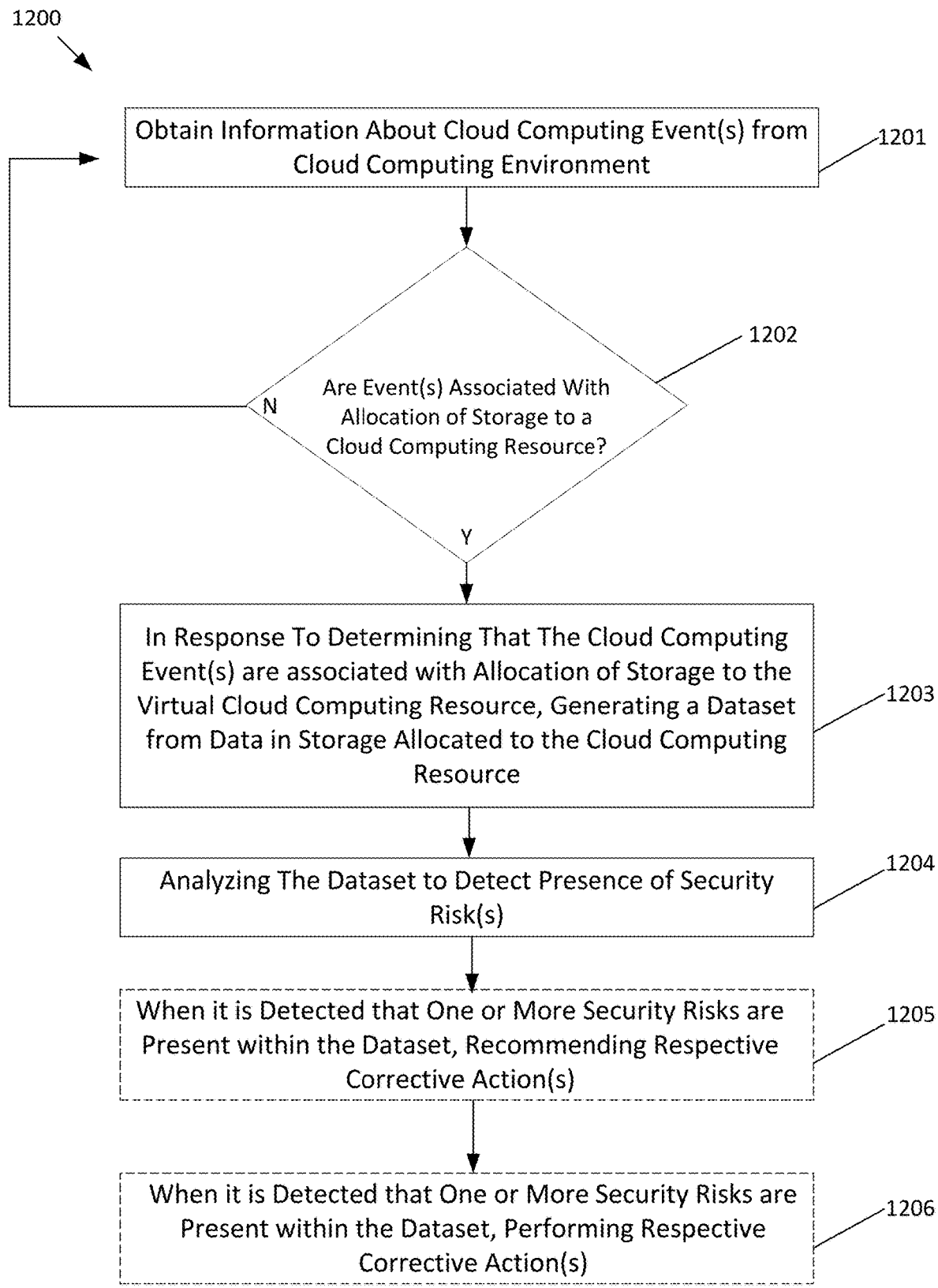
FIG. 12 is a flowchart of an example process 1200, which may be performed by an information security system for analyzing information about cloud computing events and collecting data from cloud computing resources in response to information about the cloud computing events, in accordance with some embodiments of the technology described herein.

FIG. 12 is a flowchart of an example process 1200, which may be performed by an information security system for analyzing information about cloud computing events and collecting data from cloud computing resources in response to information about the cloud computing events, in accordance with some embodiments of the technology described herein. Process 1200 begins at step 1201, in which information is obtained about one or more cloud computing events from a cloud computing environment. The information about events may be contained within one or more cloud computing logs, such as logs 115 of FIG. 1, or may otherwise be obtained from a cloud computing environment as described herein. The information obtained from the cloud computing environment in step 1201 may contain information about one or more features associated with the cloud computing event(s). As described herein, the information obtained from the cloud computing environment may undergo micro-batching; filtering, grouping, translating, and enriching messages into data structures; including metadata about actions to be performed by downstream process in the data structures; and pushing jobs associated with the data structures to a queue manager.

The information about cloud computing event(s) is analyzed in step 1202 to determine if the one or more events are associated with the allocation of storage to a cloud computing resource. As described previously, information related to a single event in which storage is attached to a cloud computing resource, such as an "Attach Volume" event in an AWS cloud computing environment may indicate the particular resource requires collection and analysis. Therefore, in step 1202, if the obtained information relates to attachment of storage to a resource, it is determined the information about the event is associated with the allocation of storage to a cloud computing resource and the process continues to step 1203. Additionally, or alternatively, as described above, information about a pair of events may be indicative of allocation of storage to a cloud computing resource, for example a first event related to the allocation of storage to the cloud computing environment and a second event related to the attachment of storage to a cloud computing resource. In an AWS cloud computing environment, the first event may be a "Create Volume" event and the second event may be an "Attach Volume" event. If the obtained information about cloud computing events includes information about a first event in which storage is allocated to the cloud computing environment and a second event in which the storage is attached to a cloud computing resource, it is determined that the events are associated with allocation of storage to a cloud computing resource and the process continues to step 1203. If the one or more events are not determined to be associated with allocation of storage to a cloud computing resource the process returns to step 1201.

In step 1203, in response to determining the one or more cloud computing events are associated with the allocation of storage to the virtual cloud computing resource, supplemental data is generated from the cloud computing resource. The supplemental data may be generated as previously described herein, with regard to enrichment of cloud computing event information. For example, step 1203 may involve communicating a resource to be collected to a cloud computing environment, after which supplemental data is generated from the data of the cloud computing resource within the cloud computing environment. This supplemental data may then be provided to the information security system for analysis in step 1204. The supplemental data may be stored within a data structure for analysis, as described herein.

The process should advance from step 1202 to step 1203 in real-time or near real-time. The process may advance from step 1202 to step 1203 within 10 minutes of determining the event(s) are associated with allocation of storage to the cloud computing resource, within 5 minutes of the determining within 4 minutes of the determining, within 3 minutes of the determining, within 2 minutes of the determining, or within 1 minute of the determining.

In step 1204, the supplemental data is analyzed by the information security system to determine the presences of security risks within the associated cloud computing resource. Examples of security risks are provided herein.

Next, at step 1205, one or more corrective actions may be recommended for any one or more of the identified security risks. Examples of corrective actions are provided herein.

Process 1200 may additionally proceed to step 1206, where one or more corrective actions may be performed to address any one or more of the identified security risks. In some embodiments, the corrective actions may be performed automatically (e.g., by an information security system such as information security system 120 of FIG. 1). Additionally, or alternatively, one or more users may be notified of the detected security risks, and the user(s) may perform at least some (e.g., all) of the corrective actions.

Figure 13:
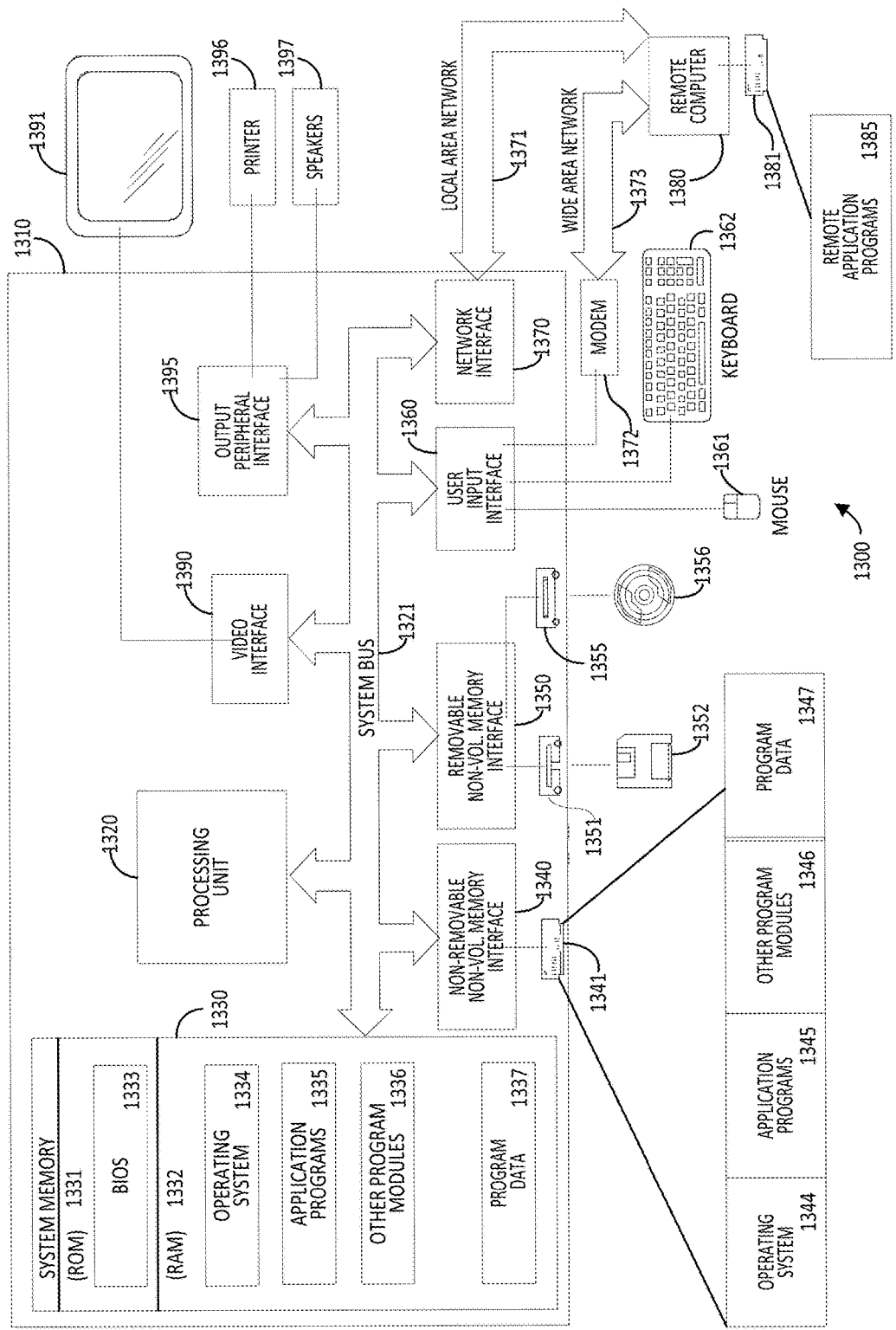
FIG. 13 shows a block diagram of an exemplary computing device, in accordance with some embodiments of the technology described herein.

FIG. 13 shows a block diagram of an example computing device, in accordance with some embodiments of the technology described herein. The computing system environment 1300 is only one example of a suitable computing environment and is not intended to suggest any limitation as to the scope of use or functionality of the technology described herein.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 13, an example system for implementing the technology described herein includes a general-purpose computing device in the form of a computer 1310. Components of computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1310 typically includes a variety of computer readable media. Computer readable media can be any available media that can be accessed by computer 1310 and includes both volatile and nonvolatile media, removable and non-removable media. By way of example, and not limitation, computer readable media may comprise computer storage media and communication media. Computer storage media includes volatile and nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by computer 1310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336, and program data 1337.

The computer 1310 may also include other removable/non-removable, volatile, or nonvolatile computer storage media. By way of example only, FIG. 13 illustrates a hard disk drive 1341 that reads from or writes to non-removable, nonvolatile magnetic media, a flash drive 1351 that reads from or writes to a removable, nonvolatile memory 1352 such as flash memory, and an optical disk drive 1355 that reads from or writes to a removable, nonvolatile optical disk 1356 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1341 is typically connected to the system bus 1321 through a non-removable memory interface such as interface 1340, and magnetic disk drive 1351 and optical disk drive 1355 are typically connected to the system bus 1321 by a removable memory interface, such as interface 1350.

The drives and their associated computer storage media described above and illustrated in FIG. 13, provide storage of computer readable instructions, data structures, program modules and other data for the computer 1310. In FIG. 13, for example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337. Operating system 1344, application programs 1345, other program modules 1346, and program data 1347 are given different numbers here to illustrate that, at a minimum, they are different copies. An actor may enter commands and information into the computer 1310 through input devices such as a keyboard 1362 and pointing device 1361, commonly referred to as a mouse, trackball, or touch pad. Other input devices (not shown) may include a microphone, joystick, game pad, satellite dish, scanner, or the like. These and other input devices are often connected to the processing unit 1320 through a user input interface 1360 that is coupled to the system bus but may be connected by other interface and bus structures, such as a parallel port, game port or a universal serial bus (USB). A monitor 1391 or other type of display device is also connected to the system bus 1321 via an interface, such as a video interface 1390. In addition to the monitor, computers may also include other peripheral output devices such as speakers 1397 and printer 1396, which may be connected through an output peripheral interface 1395.

The computer 1310 may operate in a networked environment using logical connections to one or more remote computers, such as a remote computer 1380. The remote computer 1380 may be a personal computer, a server, a router, a network PC, a peer device, or other common network node, and typically includes many or all of the elements described above relative to the computer 1310, although only a memory storage device 1381 has been illustrated in FIG. 13. The logical connections depicted in FIG. 13 include a local area network (LAN) 1371 and a wide area network (WAN) 1373 but may also include other networks. Such networking environments are commonplace in offices, enterprise-wide computer networks, intranets, and the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the actor input interface 1360, or other appropriate mechanism. In a networked environment, program modules depicted relative to the computer 1310, or portions thereof, may be stored in the remote memory storage device. By way of example, and not limitation, FIG. 13 illustrates remote application programs 1385 as residing on memory device 1381. It will be appreciated that the network connections shown are examples and other means of establishing a communications link between the computers may be used.

Having thus described several aspects of at least one embodiment of the technology described herein, it is to be appreciated that various alterations, modifications, and improvements will readily occur to those skilled in the art. Such alterations, modifications, and improvements are intended to be part of this disclosure and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, a tablet computer, a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. A computer-readable storage medium includes any computer memory configured to store software, for example, the memory of any computing device such as a smart phone, a laptop, a desktop, a rack-mounted computer, or a server (e.g., a server storing software distributed by downloading over a network, such as an app store)). As used herein, the term "computer-readable storage medium" encompasses only a non-transitory computer-readable medium that can be considered to be a manufacture (i.e., article of manufacture) or a machine.

Alternatively, or additionally, aspects of the technology described herein may be embodied as a computer readable medium other than a computer-readable storage medium, such as a propagating signal.

The terms "program" or "software" are used herein in a generic sense to refer to any type of computer code or set of processor-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor but may be distributed in a modular fashion among a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 6, 9, and 12. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately" and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for event driven harvesting of data in one or more cloud computing environments, the method comprising:

using at least one computer hardware processor to perform:

obtaining, from a first cloud computing environment, first data related to a first event that occurred in the first cloud computing environment, the first event relating to a first resource in the first cloud computing environment, the first data including a first identifier for the first event;

in response to obtaining the first data,
  requesting, from an application programming interface (API) of the first cloud computing environment and using the first identifier, first supplemental data about the first event, the first supplemental data including supplemental information about the first event and/or information about impact of the first event on the first resource;
  determining whether a security action is to be taken at least in part by analyzing the first data and/or the first supplemental data; and
  when it is determined a security action is to be taken, performing the security action.

2. The method of claim 1, further comprising:
obtaining, from a second cloud computing environment, different from the first cloud computing environment, second data related to a second event that occurred in the second cloud computing environment, the second event relating to a second resource in the second cloud computing environment, the second data including a second identifier for the second event;
in response to obtaining the second data,
  requesting, from an application programming interface (API) of the second cloud computing environment and using the second identifier, second supplemental data about the second event, the second supplemental data including supplemental information about the second event and/or information about impact of the second event on the second resource;
  determining whether a second security action is to be taken at least in by analyzing the second data and/or the second supplemental data; and
  when it is determined a second security action is to be taken, performing the security action.

3. The method of claim 2, further comprising:
after obtaining the first data and the first supplemental data,
  generating a first data structure; and
  storing the first data and the first supplemental data in the first data structure; and
after obtaining the second data and the second supplemental data,
  generating a second data structure; and
  storing the second data and the second supplemental data in the second data structure,
wherein the first data structure and the second data structure are a same type of data structure.

4. The method of claim 1, further comprising:
in response to obtaining the first data, determining whether the first supplemental data is to be requested; and
in response to determining the first supplemental data is to be requested:
  generating a first data structure having a field indicating the first supplemental data is to be requested;
  storing the first data in the first data structure; and
  requesting the first supplemental data.

5. The method of claim 4, further comprising:
before the requesting, storing a job associated with the first data structure in a queue, the queue storing jobs to be performed including scheduled data collections; and
prioritizing the job associated with the first data structure within the queue to be addressed before the scheduled data collections, in response to determining the first supplemental data is to be requested.

6. The method of claim 1, wherein information about the impact of the first event on the first resource comprises information about changes to an amount of storage associated with the first resource and information about changes to metadata associated with the first resource, and wherein information about changes to metadata associated with the first resource comprises information about changes to a structure of data within the first resource, changes to software installed on the first resource, changes to permissions for accessing the first resource, and/or changes to security rules relating to the first resource.

7. The method of claim 1, wherein performing the security action comprises performing at least one of: updating software installed in the first resource, changing a network configuration of the first resource, changing a configuration of one or more software applications executing on the first resource, changing a configuration of an operating system executing on the first resource, changing one or more permissions for the first resource, deleting malware from the first resource, removing corrupted files or data from the first resource, taking the first resource offline, killing an instance of the first resource, and/or blocking communications to and/or from the first resource.

8. The method of claim 1, wherein analyzing the first data and the first supplemental data comprises identifying presence of one or more software bugs, one or more out-of-date software applications, one or more unpatched software applications, corrupted data, unencrypted data, one or more improper access permissions for the first resource, one or more misconfigurations, one or more computer viruses, and/or malware within the first data and the first supplemental data.

9. The method of claim 1, wherein the first data is obtained from a queue managed within the first cloud computing environment, and the first data is pushed to the queue from a log of the first cloud computing environment.

10. The method of claim 1, wherein the first data is obtained from an event subscription, and the requesting comprises requesting the first supplemental data from a resource API associated with the first cloud computing environment by querying the resource API for information associated with the first resource and collecting information related to the impact of the first event on the first resource.

11. The method of claim 1, wherein the first data and/or the supplemental data includes an event type of the first event; and
further comprising:
  in response to determining, based on the event type, the first event is associated with allocation of storage to the first resource, taking a snapshot of storage attached to the first resource.

12. The method of claim 11, wherein the first cloud computing environment is an AWS cloud computing environment, and taking the snapshot is performed in response to determining the first event is an Attach Volume event type.

13. A system for event-driven harvesting of data in one or more cloud computing environments, the system comprising:
  at least one computer hardware processor; and
  at least one non-transitory computer-readable storage medium storing processor-executable instructions that, when executed by the at least one computer hardware processor, cause the at least one computer hardware processor to perform a method comprising:
    obtaining, from a first cloud computing environment, first data related to a first event that occurred in the first cloud computing environment, the first event relating to a first resource in the first cloud computing environment, the first data including a first identifier for the first event;

in response to obtaining the first data,
requesting, from an application programming interface (API) of the first cloud computing environment and using the first identifier, first supplemental data about the first event, the first supplemental data including supplemental information about the first event and/or information about impact of the first event on the first resource;

determining whether a security action is to be taken at least in part by analyzing the first data and/or the first supplemental data; and when it is determined a security action is to be taken, performing the security action.

14. The system of claim 13, wherein the method further comprises:

obtaining, from a second cloud computing environment, different from the first cloud computing environment, second data related to a second event that occurred in the second cloud computing environment, the second event relating to a second resource in the second cloud computing environment, the second data including a second identifier for the second event;

in response to obtaining the second data,
requesting, from an application programming interface (API) of the second cloud computing environment and using the second identifier, second supplemental data about the second event, the second supplemental data including supplemental information about the second event and/or information about impact of the second event on the second resource;

determining whether a second security action is to be taken at least in by analyzing the second data and/or the second supplemental data; and when it is determined a second security action is to be taken, performing the security action.

15. The system of claim 14, wherein the method further comprises:

after obtaining the first data and the first supplemental data,
generating a first data structure; and
storing the first data and the first supplemental data in the first data structure; and after obtaining the second data and the second supplemental data,
generating a second data structure; and
storing the second data and the second supplemental data in the second data structure, wherein the first data structure and the second data structure are a same type of data structure.

16. The system of claim 13, wherein information about the impact of the first event on the first resource comprises information about changes to an amount of storage associated with the first resource and information about changes to metadata associated with the first resource, and wherein information about changes to metadata associated with the first resource comprises information about changes to a structure of data within the first resource, changes to software installed on the first resource, changes to permissions for accessing the first resource, and/or changes to security rules relating to the first resource.

17. At least one non-transitory computer-readable storage medium storing processor-executable instructions that, when executed by at least one computer hardware processor, cause the at least one computer hardware processor to perform a method comprising:

obtaining, from a first cloud computing environment, first data related to a first event that occurred in the first cloud computing environment, the first event relating to a first resource in the first cloud computing environment, the first data including a first identifier for the first event;

in response to obtaining the first data,
requesting, from an application programming interface (API) of the first cloud computing environment and using the first identifier, first supplemental data about the first event, the first supplemental data including supplemental information about the first event and/or information about impact of the first event on the first resource;

determining whether a security action is to be taken at least in part by analyzing the first data and/or the first supplemental data; and when it is determined a security action is to be taken, performing the security action.

18. The at least one non-transitory computer-readable storage medium of claim 17, wherein the method further comprises:

obtaining, from a second cloud computing environment, different from the first cloud computing environment, second data related to a second event that occurred in the second cloud computing environment, the second event relating to a second resource in the second cloud computing environment, the second data including a second identifier for the second event;

in response to obtaining the second data,
requesting, from an application programming interface (API) of the second cloud computing environment and using the second identifier, second supplemental data about the second event, the second supplemental data including supplemental information about the second event and/or information about impact of the second event on the second resource;

determining whether a second security action is to be taken at least in by analyzing the second data and/or the second supplemental data; and when it is determined a second security action is to be taken, performing the security action.

19. The at least one non-transitory computer-readable storage medium of claim 18, wherein the method further comprises:

after obtaining the first data and the first supplemental data,
generating a first data structure; and
storing the first data and the first supplemental data in the first data structure; and after obtaining the second data and the second supplemental data,
generating a second data structure; and
storing the second data and the second supplemental data in the second data structure, wherein the first data structure and the second data structure are a same type of data structure.

20. The at least one non-transitory computer-readable storage medium of claim 17, wherein information about the impact of the first event on the first resource comprises information about changes to an amount of storage associated with the first resource and information about changes to metadata associated with the first resource, and wherein information about changes to metadata associated with the first resource comprises information about changes to a structure of data within the first resource, changes to software installed on the first resource, changes to permissions for accessing the first resource, and/or changes to security rules relating to the first resource.

\* \* \* \* \*